US010029587B2

(12) United States Patent
Hattori et al.

(10) Patent No.: US 10,029,587 B2
(45) Date of Patent: Jul. 24, 2018

(54) VEHICLE SEAT

(71) Applicant: TOYOTA BOSHOKU KABUSHIKI KAISHA, Aichi-ken (JP)

(72) Inventors: Takashi Hattori, Aichi-ken (JP); Tomio Matsufuji, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/483,224

(22) Filed: Apr. 10, 2017

(65) Prior Publication Data

US 2017/0291507 A1    Oct. 12, 2017

(30) Foreign Application Priority Data

Apr. 11, 2016    (JP) .................................. 2016-079060

(51) Int. Cl.
*B60N 2/08*    (2006.01)
*B60N 2/20*    (2006.01)

(52) U.S. Cl.
CPC ............. *B60N 2/0837* (2013.01); *B60N 2/20* (2013.01)

(58) Field of Classification Search
CPC ............................... B60N 2/20; B60N 2/0837
USPC ............................................. 297/344.1, 341
See application file for complete search history.

(56) References Cited

U.S. PATENT DOCUMENTS

| | | | | |
|---|---|---|---|---|
| 5,516,071 A | * | 5/1996 | Miyauchi ............. | B60N 2/0705 297/331 |
| 7,971,920 B2 | * | 7/2011 | Jang ...................... | B60N 2/123 297/341 X |
| 8,408,649 B2 | * | 4/2013 | Ito ........................ | B60N 2/0843 297/340 |
| 2008/0309136 A1 | * | 12/2008 | Kojima ................... | B60N 2/12 297/340 |
| 2014/0239141 A1 | | 8/2014 | Yamada et al. | |

FOREIGN PATENT DOCUMENTS

JP    2014-166823    9/2014

* cited by examiner

*Primary Examiner* — Anthony D Barfield
(74) *Attorney, Agent, or Firm* — Greenblum & Bernstein, P.L.C.

(57) ABSTRACT

A vehicle seat including a slide lock mechanism which is configured to lock a locked part provided to a second rail side to a locking part provided to a first rail side or release the locking of the locked part and the locking part, and a walk-in mechanism including a shifting preparation mechanism part which is provided to the first rail side, a holding mechanism part which is provided to the second rail side and holds a locking released state of the slide lock mechanism, and a holding release mechanism part which is provided to the second rail side and shifts the locking released state of the slide lock mechanism to a state where the slide lock mechanism is capable of shifting to the locked state.

6 Claims, 19 Drawing Sheets

VEHICLE SEAT

CROSS-REFERENCE TO RELATED APPLICATIONS

This application claims priority from Japanese Patent Application No. 2016-079060 filed on Apr. 11, 2016, the entire contents of which are incorporated herein by reference.

TECHNICAL FIELD

The disclosure relates to a vehicle seat.

BACKGROUND

A vehicle seat including a so-called walk-in mechanism is known in JP-A-2014-166823, for example. The vehicle seat in JP-A-2014-166823 is a type that includes a walk-in mechanism for releasing a slide lock mechanism in association with a forward tilting of a seat back, in addition to a configuration in which the slide lock mechanism is released by a normal operation and a seat main body is moved to a desired slide position.

However, in the above-described technology, in order to fix the seat main body, in which the seat back is in a tilted forward state, at a desired slide position, it is necessary to move the seat back into a standing state. That is, a slide lock release state is continuously held when the seat back is in the tilted forward state. Therefore, it is desired to enhance the convenience in the operation of the seat main body including the walk-in mechanism.

SUMMARY

The disclosure has been devised in view of such situation and an object to be achieved by the disclosure is to provide a vehicle seat including a walk-in mechanism in which slide lock at a fixed position after a walk-in operation is possible even when a seat back is in a forward-tiled state.

According to an aspect of the disclosure, there is provided a vehicle seat including: an elongated first rail fixed to an interior wall surface of a vehicle; a second rail which is configured to move relative to the first rail in a longitudinal direction thereof and support a seat main body; a slide lock mechanism which is configured to lock a locked part provided to the second rail side to a locking part provided to the first rail side or release the locking of the locked part and the locking part at a predetermined relative position of the second rail to the first rail in a lockable region, the lockable region being a region where the locking part and the locked part are configured to be selectively locked to each other at a plurality of positions in the longitudinal direction; and a walk-in mechanism which is provided to the first rail side and the second rail side and is configured to release a locked state of the slide lock mechanism and hold a state where the locked state is released in association with a forward tilting operation of a seat back, wherein the walk-in mechanism includes a shifting preparation mechanism part which is provided to the first rail side at a position on a front side of the lockable region and is configured to shift the slide lock mechanism from a locking released state to a state where the slide lock mechanism is capable of shifting to the locked state, and wherein the walk-in mechanism includes a holding mechanism part which is provided to the second rail side and holds the locking released state of the slide lock mechanism when the seat main body in which the seat back is in a forward-tilted state is slid so as to come into contact with the shifting preparation mechanism part from the rear side, and a holding release mechanism part which is provided to the second rail side and shifts the locking released state of the slide lock mechanism to the state where the slide lock mechanism is capable of shifting to the locked state when the seat main body in which the seat back is in the forward-tilted state is moved rearward from a foremost position to which the seat main body can slide and comes into contact with the shifting preparation mechanism part from the front side.

Accordingly, in the vehicle seat having the above-described configuration, when the seat main body in which the seat back is in the forward-tilted state is moved to the foremost position to which the seat main body can slide, the locking released state of the slide lock mechanism is held by the configuration of the holding mechanism part. On the other hand, when the seat main body in which the seat back is in the forward-tilted state is moved rearward from the foremost position to which the seat main body can slide, the locking released state of the slide lock mechanism can be shifted to the state where the slide lock mechanism is capable of shifting to the locked state by the configuration of the holding release mechanism part and the shifting preparation mechanism part. Therefore, the locked part and the locking part are locked at a foremost position of the lockable region of the slide lock mechanism. Accordingly, even when the seat main body remains in the forward-tilted state, the slide lock is carried out at the foremost position of the lockable region serving as the fixed position. As a result, it is possible to realize a vehicle seat including a walk-in mechanism in which the slide lock at the fixed position after the walk-in operation is possible even when the seat back is in the forward-tilted state. Further, since the seat main body is slide-locked at the foremost position of the lockable region serving as the fixed position while the seat main body remains in the forward-tilted state, it is possible to secure a wider space behind the seat main body. In this way, it is possible to further enhance the convenience in the sliding operation of the seat main body including the walk-in mechanism.

DETAILED DESCRIPTION

Figure 1:
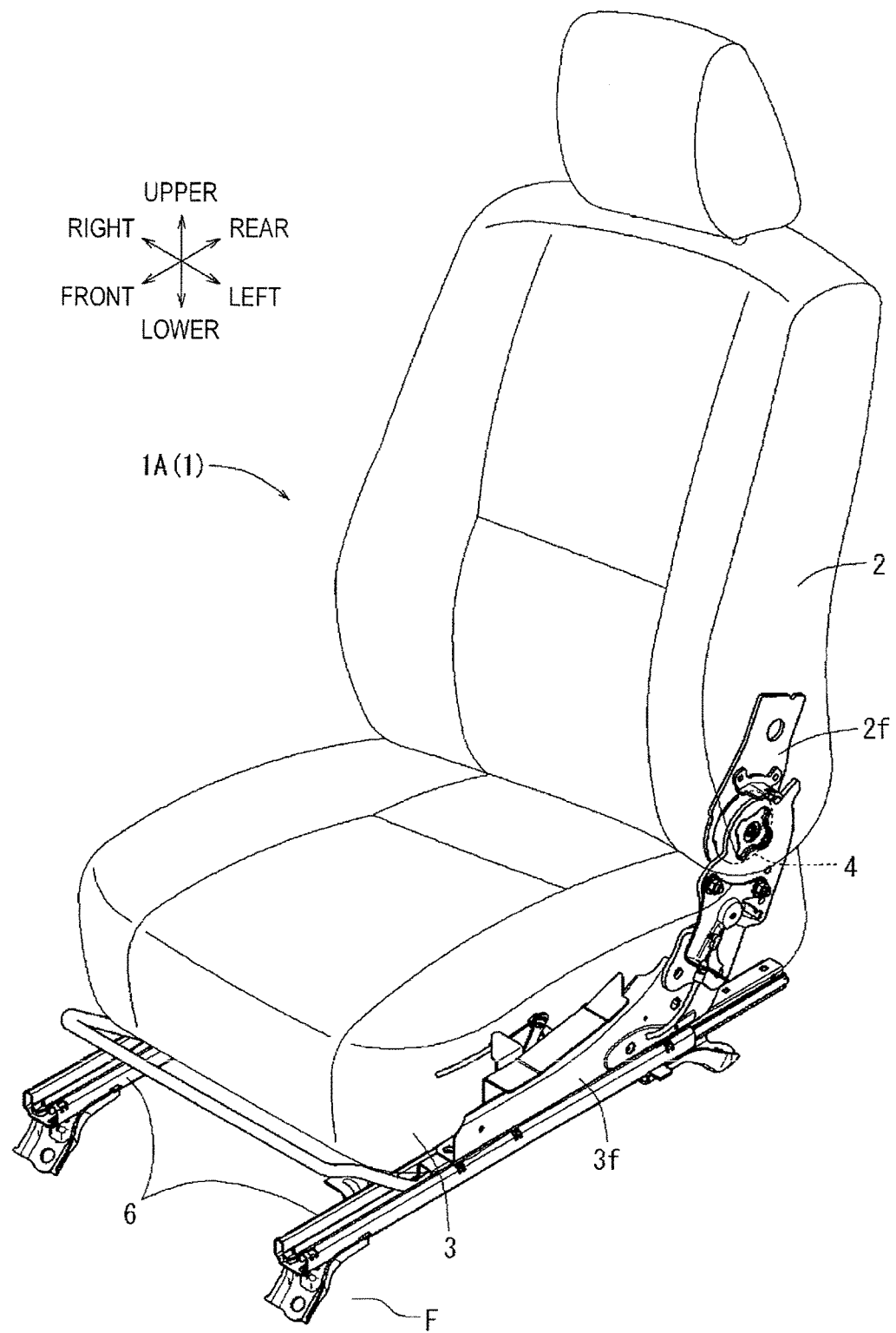
FIG. 1 is an overall perspective view showing an outline of an automobile seat according to a first embodiment.

Hereinafter, an embodiment of the disclosure will be described with reference to FIGS. 1 to 20. In the present embodiment, an automobile seat in an automobile is described as an example of a vehicle seat. Here, the directions appropriately indicated by the arrows in respective drawings represent the front and rear, the left and right, and the upper and lower as seen from a seated occupant in a state where the seated occupant is seated on the automobile seat. Further, in order to describe the configuration of the embodiment in an easy-to-understand manner, each drawing mainly shows the internal structure of a seat main body 1. Therefore, for a seat back 2 and a seat cushion 3, an internal frame structure such as a back frame 2f and a cushion frame 3f constituting a framework is mainly shown, and equipment such as a skin material or a seat pad to be externally attached is not shown.

An automobile seat in the present embodiment is exemplified as being arranged in a second row of an automobile. As shown in FIG. 1, the automobile seat includes the seat back 2 serving as a backrest portion configuring the seat main body 1 and the seat cushion 3 serving as a seating portion. The seat main body 1 is connected to the seat cushion 3 by reclining devices 4 provided to both lower side portions in a width direction of the seat back 2. In this way, a backrest angle of the seat back 2 with respect to the seat cushion 3 can be adjusted, or the seat back 2 can be forward-tilted toward the upper side of the seat cushion 3. That is, the seat main body 1 can be set to two positions of an upright state 1A in which the seat back 2 stands with respect to the seat cushion 3 and a forward-tilted state 1B (see FIG. 7) in which the seat back 2 is forward-tilted toward the upper side of the seat cushion 3.

The reclining devices 4 are normally held in a locked state where the backrest angle of the seat back 2 is fixed. The reclining devices 4 are released from the locked state by pivotally operating a reclining lever (not shown) disposed at the seat cushion 4 side, so that the backrest angle of the seat back 2 can be adjusted. Further, the reclining devices 4 can be operated to be simultaneously released from the locked state by operating a walk-in lever different from the reclining lever. For example, the walk-in lever is disposed on the back side of the seat back and can be operated by an occupant seated on the rear seat. Here, the reclining lever and the walk-in lever are collectively referred to as an operating lever. In the reclining devices 4, operation parts of lock mechanisms are connected to each other by a rod part, and the shifting between locking and locking releasing is synchronously performed on the left and right sides. Therefore, the locked state of the reclining devices 4 are simultaneously released by operating the operating lever, and thus, the fixed state of the backrest angle of the seat back 2 is released, whereby the seat back 2 moves to the forward-tilted state 1B where the seat back 2 is forward-tilted toward the seat cushion 3.

Here, a spring member (not shown) is hooked between the seat back 2 and the seat cushion 3. The spring member is normally urged in a pivoting direction in which the seat back 2 is tilted forward. Therefore, when the operating lever is operated in the state where an occupant is not seated on the seat main body 1, the seat back 2 is automatically tilted forward by the urging of the spring member and falls down toward the seat cushion 3. The reclining devices 4 above are normally urged in an operation direction in which they are locked. Accordingly, when the pivot operation of the operating lever is stopped, the reclining devices 4 are automatically returned to the locked state. However, in the reclining devices 4, a lock zone in which the reclining devices 4 are returned to the locked state when the pivot operation of the operating lever is stopped and a free zone in which the reclining devices 4 are not returned to the locked state even when the pivot operation of the operating lever is stopped are also set.

The lock zone is typically set in an angular region used as the backrest by an occupant seated on the seat main body 1. That is, the lock zone is set in a region between a pivotal position in which the seat back 2 has a posture of the upright state 1A (see FIG. 1) where the seat back 2 stands with respect to the seat cushion 3 and a pivotal position in which the seat back 2 is fully tilted to the rear side. Further, the free zone is set in an angular region in which an occupant does not use for seating. That is, the free zone is set in a region between a pivotal position in which the seat back 2 has a posture of the upright state 1A (see FIG. 1) and a pivotal position in which the seat back 2 has a posture of the forward-tilted state 1B (see FIG. 7) where the seat back 2 is fully tilted to the front side. Therefore, by operating the operating lever when tilting the seat back 2 forward, the seat back 2 is tilted forward from the posture of the upright state 1A. Then, even when the operation of the operating lever is stopped, the seat back 2 is automatically tilted to have the posture of the forward-tilted state 1B (see FIG. 7).

Figure 2:
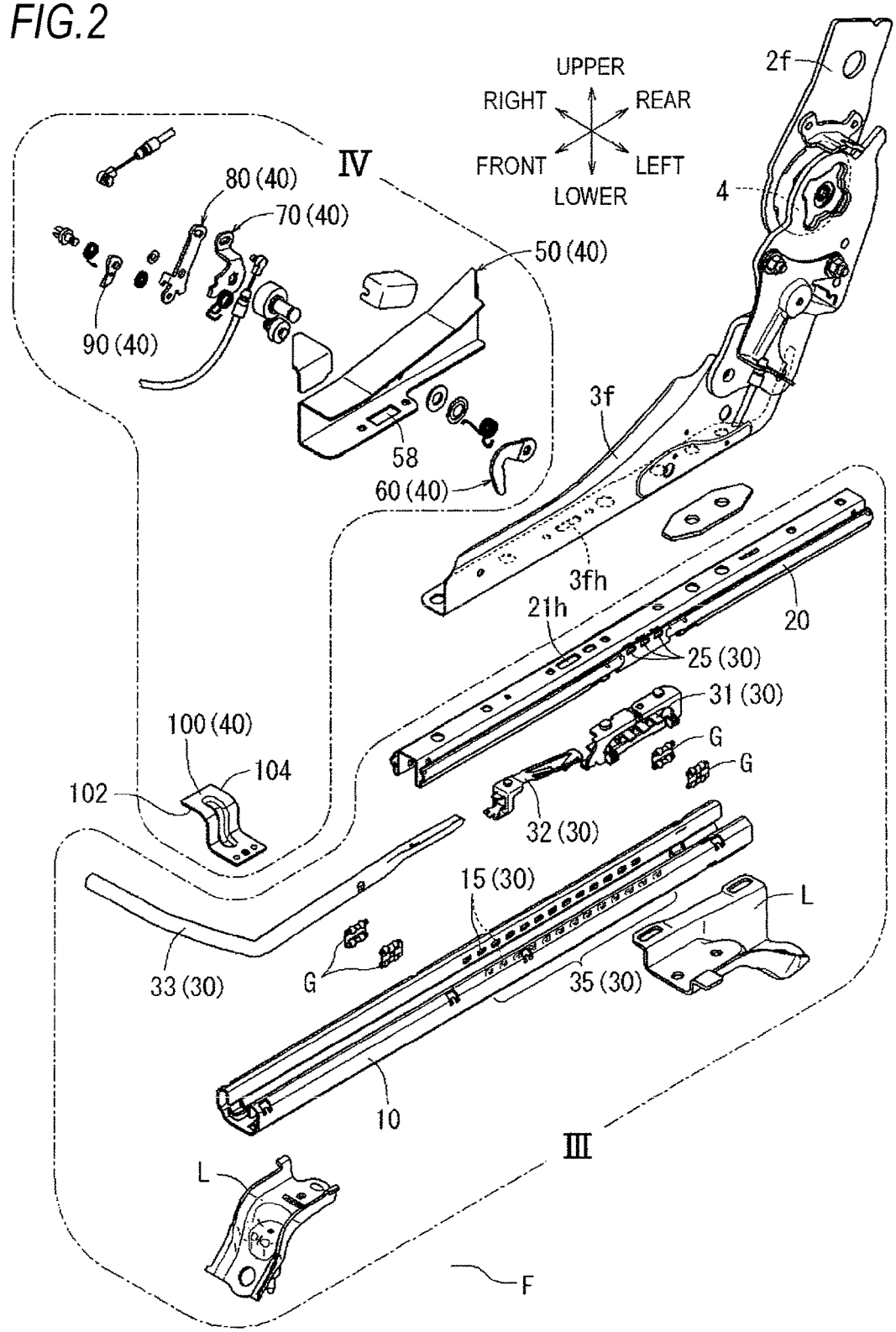
FIG. 2 is an exploded perspective view showing the automobile seat.

As shown in FIG. 1, a slide rail 6 is provided between the above-described seat main body 1 and a floor surface F (interior wall surface). The slide rail 6 makes it possible to adjust the seating position of the seat main body 1 with respect to the floor surface F in the front and rear direction of the automobile. A pair of left and right slide rails 6 is provided between the seat cushion 3 and the floor surface F. The slide rails 6 are located on both sides of the seat main body 1 and are disposed parallel to each other in the front and rear direction of the automobile. As shown in FIG. 2, each slide rail 6 mainly includes a lower rail 10 (first rail), an upper rail 20 (second rail), a slide lock mechanism 30, and a walk-in mechanism 40. Here, since the left and right slide rails 6 in the present embodiment are configured to synchronously perform the same operation on the left and right sides, in FIG. 2 and subsequent figures, the left slide rail 6 is representatively shown and the right slide rail 6 is not shown.

Figure 3:
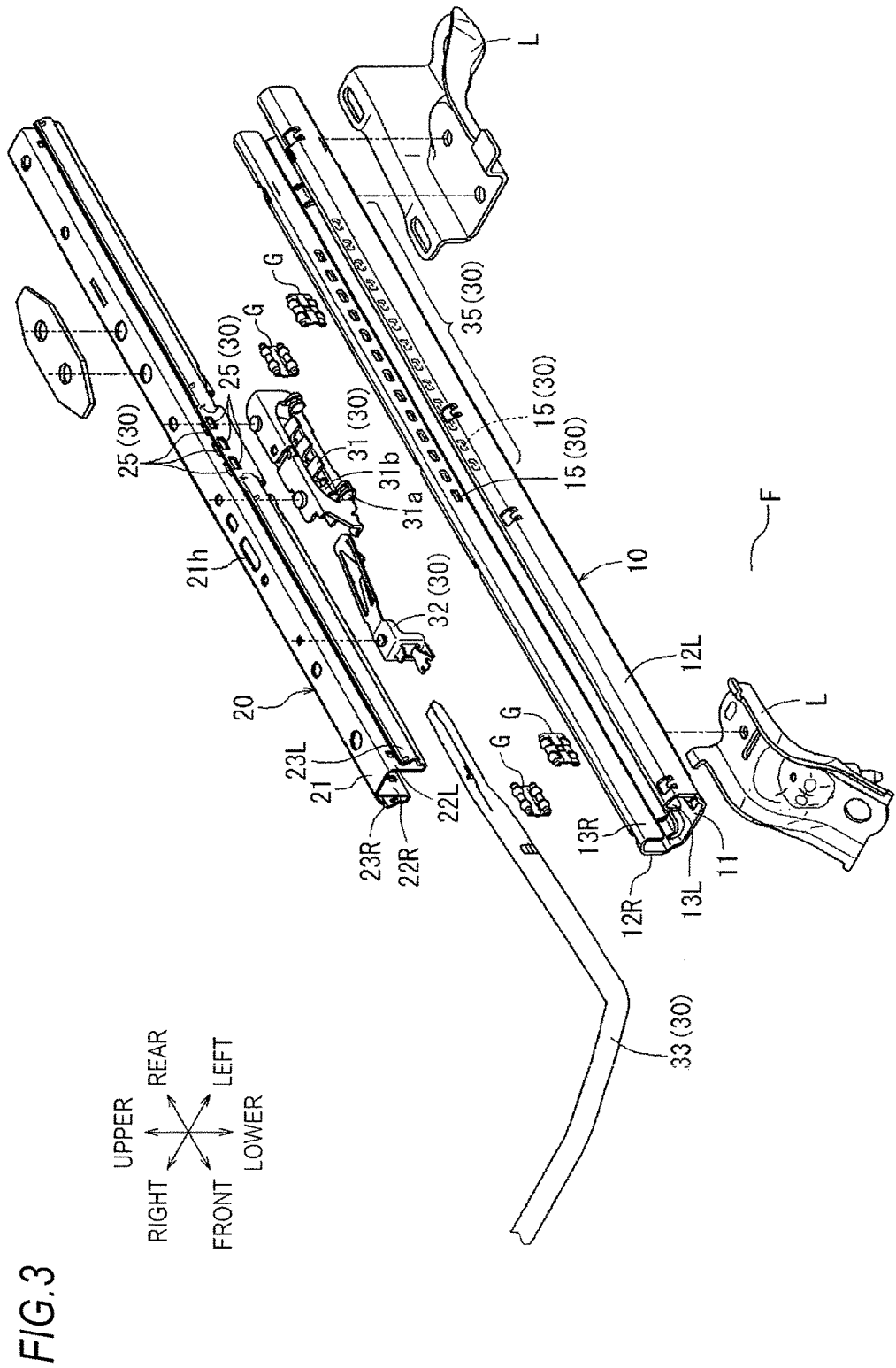
FIG. 3 is an exploded perspective view showing the III part in FIG. 2 which is partially enlarged.

As shown in FIG. 3, the lower rail 10 (first rail) is an elongated member extending in the front and rear direction of the automobile and is fixed on a vehicle-body constituting member such as the floor surface F via leg portions L. The lower rail 10 is integrally formed into a horizontal cross-sectional shape which will be described below by bending a single flat plate-shaped member made of a steel material in some places. Specifically, the lower rail 10 has a flat plate-shaped lower surface portion 11 facing the floor surface F. The lower surface portion 11 has a right surface portion 12R and a left surface portion 12L, each of which has a flat-plate shape and stands from both ends of the lower surface portion 11 in the width direction. The lower surface portion 11 has a right folded-back surface portion 13R and a left folded-back surface portion 13L, each of which has a flat-plate shape and is folded inwardly from upper ends of the right surface portion 12R and the left surface portion 12L so as to extend downwards. A plurality of locking holes 15 (locking part) penetrating in a plate thickness direction is arranged adjacent to each other at equal intervals along the longitudinal direction in the right folded-back surface portion 13R and the left folded-back surface portion 13L.

As shown in FIG. 3, the upper rail 20 (second rail) is provided to the seat main body 1 side and is fitted into the lower rail 10 so as to be slidable in the longitudinal direction of these rails. In this way, the upper rail 20 supports the seat main body 1 and moves the seating position of the seat main body 1 in the longitudinal direction of the automobile in association with the sliding. The upper rail 20 is integrally formed into a cross-sectional shape described below by bending a single flat plate-shaped member made of a steel material in some places. Specifically, the upper rail 20 has a flat plate-shaped upper surface portion 21 substantially parallel to the floor surface F. The upper surface portion 21 has a right surface portion 22R and a left surface portion 22L, each of which has a flat-plate shape and extends straightly downwards from both ends of the upper surface portion 21 in the width direction. The right surface portion 22R and the left surface portion 22L have a right folded-back surface portion 23R and a left folded-back surface portion 23L, each of which is folded in a curved shape outwardly from lower ends thereof, respectively. A substantially central portion of each of the right folded-back surface portion 23R and the left folded-back surface portion 23L in the longitudinal direction is formed in a flat-plate shape. In the same positions of the flat plate-shaped right and left folded-back surface portions 23R, 23L and the right and left surface portions 22R, 22L, through-holes 25 penetrating in the plate thickness direction are arranged adjacent to each other at equal intervals along the longitudinal direction. Three through-holes 25 are provided, respectively. The interval between the through-holes 25 is the same as the interval between the locking holes 15. Further, a first cutout hole 21h penetrating in the plate thickness direction is provided substantially at the center of the upper surface portion 21 of the upper rail 21. The first cutout hole 21h is configured to allow a pressing portion 64 of a pressing claw 60 of the walk-in mechanism 40 (to be described later) to be inserted therethrough. Similarly, a second cutout hole 3fh is provided to the position of the cushion frame 3f corresponding to the first cutout hole 21h.

As shown in FIG. 3, guide members G having rolling elements incorporated therein are interposed between the right and left folded-back surface portions 13R, 13L of the lower rail 10 and the right and left folded-back surface portion 23R, 23L of the upper rail 20. In this way, the upper rail 20 can smoothly move relative to the lower rail 10 without rattling. Further, slide stoppers (not shown) are provided in the vicinity of front and rear ends of the lower rail 10. On the other hand, slider stoppers (not shown) are provided in the vicinity of the front and rear of the through-holes 25 in the upper rail 20. As the slide stoppers of the lower rail 10 and the slide stoppers of the upper rail 20 are engaged, the upper rail 20 can slide within a range that it is not detached from the lower rail 10. Here, the position at which the upper rail 20 slides to the foremost position with respect to the lower rail 20 is a "foremost sliding position 20FE" to which the seat main body can slide. Further, the position at which the upper rail 20 slides to the rearmost position with respect to the lower rail 10 is a "rearmost sliding position" to which the seat main body can slide.

As shown in FIGS. 2 and 3, the slide lock mechanism 30 is a mechanism capable of restricting or releasing the relative movement (sliding movement) of the upper rail 20 to the lower rail 10 at a predetermined relative position. The slide lock mechanism 30 includes a lock claw 31, a plate spring 32, and a loop handle 33.

As shown in FIGS. 2 and 3, the lock claw 31 is interposed between the right surface portion 22R and the left surface portion 22L of the upper rail 20 and located at the position of the through-holes 25. The lock claw 31 has three claw shapes that can be inserted into the through-holes 25 and the lock holes 15. The lock claw 31 has a support shaft 31a (see FIGS. 19 and 20) parallel to the longitudinal direction of the upper rail 20 and is pivotable about the support shaft 31a. A part of the lock claw 31 is cut and raised to form a cut-and-raised piece 31b (see FIGS. 19 and 20). The lock claw 31 is pivotable by the cut-and-raised piece 31b being engaged with the loop handle 33 (to be described later). A spring member (not shown) is interposed between the lock claw 31 and the upper 20. In this way, the lock claw 31 is normally in a state of being urged in a direction in which the claw shapes on the leading end thereof are inserted into each of the through-holes 25 and the lock holes 15 by an urging force of the spring member. Therefore, the sliding position of the upper rail 20 is in a positional state where the through-holes 25 formed in the upper rail 20 and the lock holes 15 formed in the lower rail 10 are aligned, so that the lock claw 31 are inserted through the through-holes 25 and the lock holes 15. In this way, the slide lock mechanism 30 is in a state of restricting the relative movement (sliding movement) of the upper rail 20 with respect to the lower rail 10 at a predetermined relative position. On the other hand, the slide lock mechanism 30 is in a state of allowing the relative movement (sliding movement) of the upper rail 20 with respect to the lower rail 10 in a state where the claw shapes of the lock claw 31 are retracted (disengaged) from the through-holes 25 and the lock holes 15.

Figure 19:
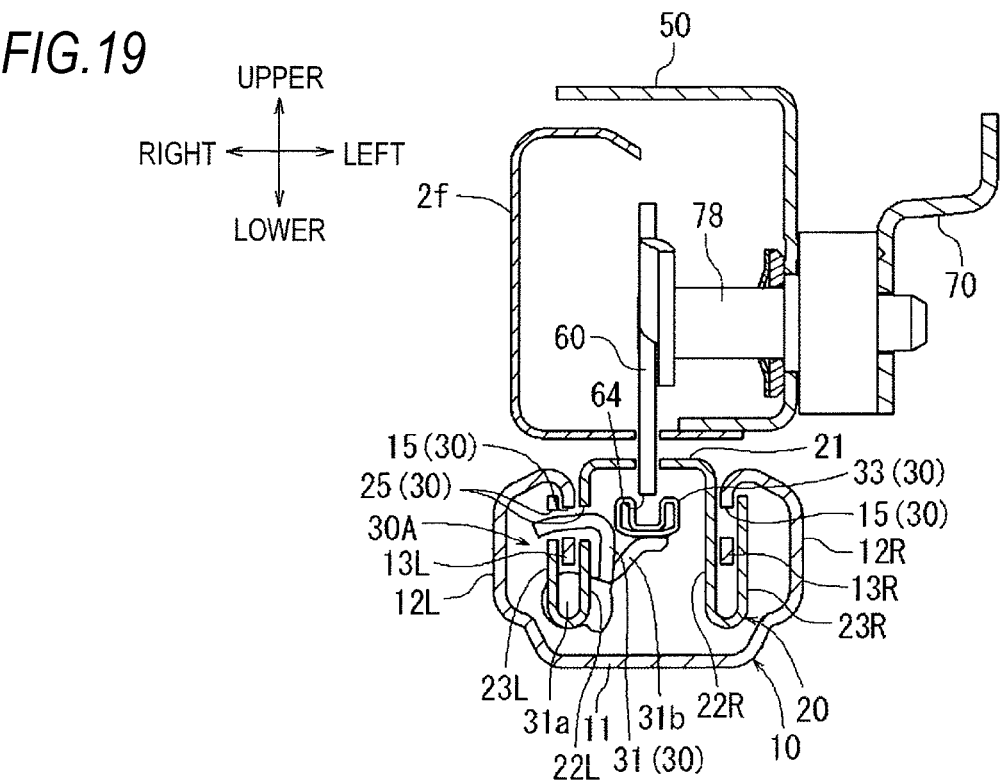
FIG. 19 is a sectional view taken along the line XIX-XIX in FIG. 12.
Figure 20:
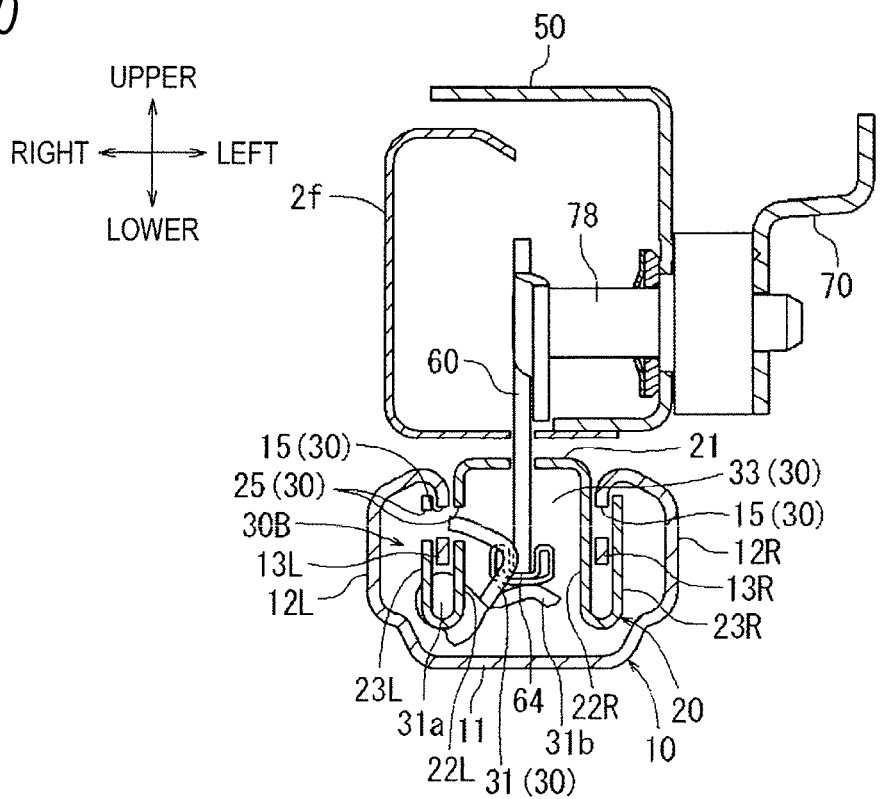
FIG. 20 is a sectional view taken along the line XX-XX in FIG. 14.

Here, in the slide lock mechanism 30, as shown in FIG. 19, a state where the claw shapes of the lock claw 31 are inserted through the through-holes 25 and the lock holes 15 in the positional state where the through-holes 25 and the lock holes 15 are aligned is referred to as a "locked state 30A." Further, in the slide lock mechanism 30, as shown in FIG. 20, a state where the claw shapes of the lock claw 31 are retracted (disengaged) from the through-holes 25 and the lock holes 15 against the urging of the spring member is referred to as a "locking released state 30B." The seat main body 1 in the locked state 30A is in a state where its position in the longitudinal direction with respect to the lower rail 10 is held. The seat main body 1 in the locking released state 30B is in a state of being slidable with respect to the lower rail 10. Meanwhile, a plurality of lock holes 15 is arranged in the longitudinal direction of the lower rail 10, and the lock claw 31 can be selectively locked to the lock holes 15 at a plurality of positions. Therefore, inside the range in which the lock claw 31 can be locked to the holes 15, the foremost position is referred to as a "frontmost position FM" (see FIGS. 11 and 18) and the rearmost position is referred to as a "rearmost position RM" (see FIGS. 5 and 12). In the slide lock mechanism 30, the region between the frontmost position FM and the rearmost position RM is a "lockable region 35" (see FIGS. 2 and 3) in which the lock holes 15 (locking part) provided to the lower rail 10 and the lock claw 31 (locked part) provided to the upper rail 20 can be locked to each other.

As shown in FIGS. 2 and 3, the loop handle 33 is formed in a U shape by, for example, appropriately bending and drawing a metallic rod-like member. A leading end portion of the loop handle 33 is inserted between the lower rail 10 and the upper rail 20 of each of the left and right slide rails 6. The leading end portion of the loop handle 33 is inserted to an engaging position where it can press the cut-and-raised piece 31b of the lock claw 31 from above. The plate spring 32 is a member which supports the leading end portion of the loop handle 33 and has plate-like portion elastically urges the loop handle 33. As shown in FIG. 19, the leading end portion of the loop handle 33 is normally positioned at an initial position where it does not press the cut-and-raised piece 31b of the lock claw 31 from above by the urging of the plate spring 32. In this way, the slide lock mechanism 30 is in the locked state 30A. On the other hand, as shown in FIG. 20, when an operating force is exerted in a direction to lift the loop handle 33 upward, the leading end portion is positioned at a pressing position in which it presses the upper surface of the cut-and-raised piece 31b of the lock claw 31 against the urging force of the plate spring 32. In this way, the slide lock mechanism 30 is in the locking released state 30B.

Figure 4:
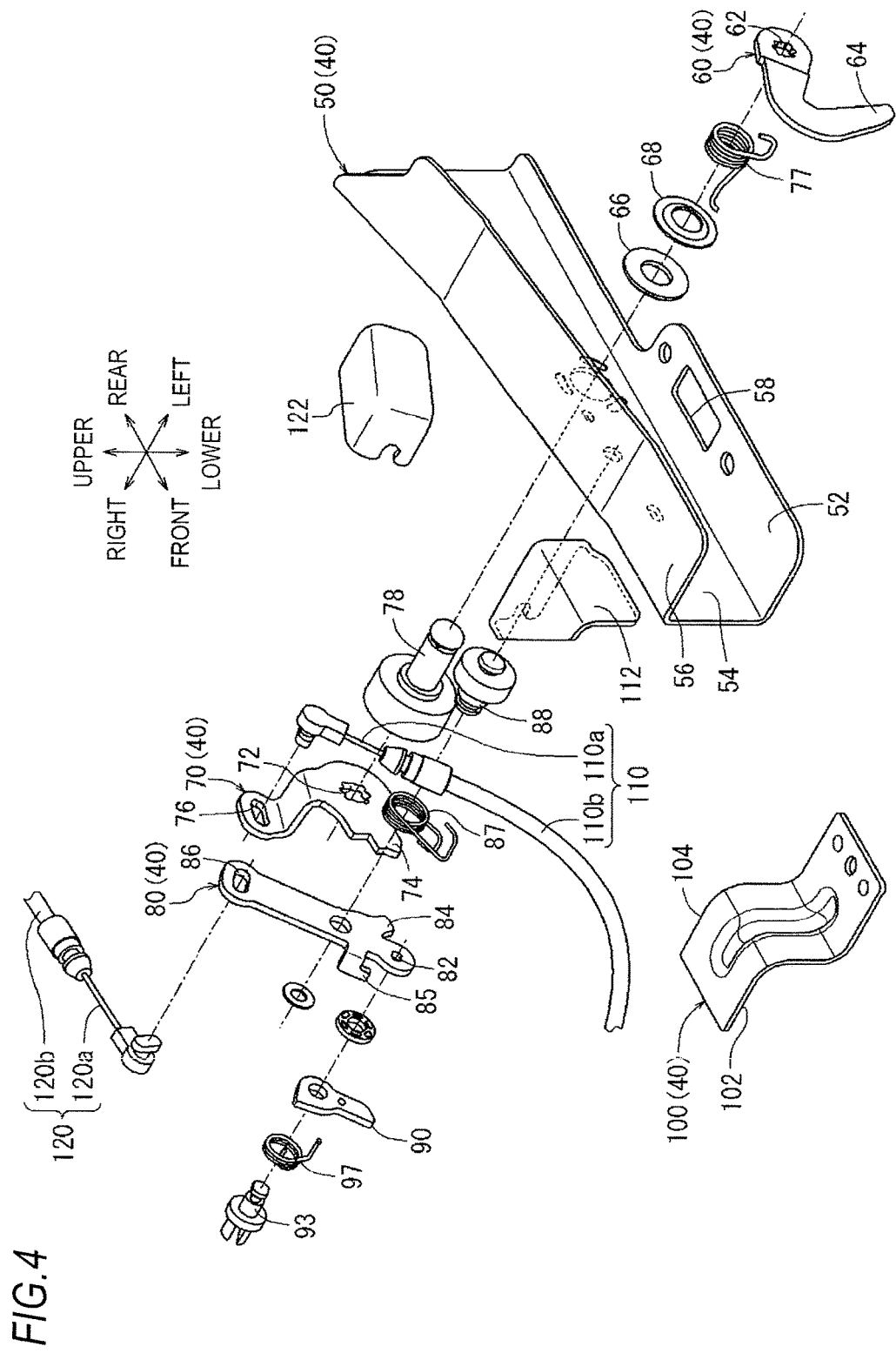
FIG. 4 is an exploded perspective view showing the IV part in FIG. 2 which is partially enlarged.

As shown in FIGS. 2 and 4, the walk-in mechanism 40 is provided to the lower rail 10 side and at the upper rail 20 side. The walk-in mechanism 40 is a mechanism which shifts the locked state 30A by the slide lock mechanism 30 to the locking released state 30B in association with the forward-tilting operation of the seat back 2 and holds the locking released state 30B. Here, the walk-in mechanism 40 is a mechanism which operates in association with the forward-tilting operation of the seat back 2 without operating the loop handle 33 of the slide lock mechanism 30.

The walk-in mechanism 40 is incorporated in a support bracket 50 disposed above the upper rail 20. The support bracket 50 is a bracket having a substantially C-shaped section. The support bracket 50 includes a lower surface portion 52 parallel to the upper surface portion 21 of the upper rail 20, a side surface portion 54 standing upward from one end of the lower surface portion 52 in the width direction, and an upper surface portion 56 covering the lower surface portion 52 from the upper end of the side surface portion. The lower surface portion 52 is provided with a third cutout hole 58 at a position corresponding to the first cutout hole 21h. The side surface portion 54 is provided with a hole portion for pivotally supporting the pressing claw 60, a first pivot member 70 and a second pivot member 80.

The pressing claw 60 is provided so as to be positioned on the left side of the side surface portion 54 and above the upper rail 20. The pressing claw 60 is a substantially V-shaped plate-like member. A non-circular fitting hole 62 penetrating in the plate thickness direction is provided to one end of the pressing claw 60. The pressing portion 64 for pressing the leading end of the loop handle 33 through the first cutout hole 21h the second cutout hole 3fh and the third cutout hole 58 is provided to the other end of the pressing claw 60. The pressing claw 60 is fitted, together with a washer 66 and a push nut 68, on one end of a first support shaft 78 and is pivotally supported on the side surface portion 54 of the support bracket 50.

The first pivot member 70 is fitted on the other end of the first support shaft 78. The first pivot member 70 is provided on the right side of the side surface portion 54. Similarly to the pressing claw 60, the first pivot member 70 is also provided with a non-circular fitting hole 72 penetrating in the plate thickness direction. The first pivot member 70 is fitted on the other end of the first support shaft 78. In this way, the first pivot member 70 and the pressing claw 60 are configured to be integrally pivoted about the first support shaft 78. The first pivot member 70 is provided with an angular engaging portion 74 protruding in the radial direction. Further, the first pivot member 70 has an arm-like tip extending in the radial direction. A first inner hook portion 76 to which an inner member 110a of a first cable 110 is hooked is provided in the tip of the first pivot member 70.

A first coil spring 77 for urging the first pivot member 70 and the pressing claw 60 to pivot relative to the support bracket 50 is hooked between the support bracket 50 and the pressing claw 60. One end of the first coil spring 77 is hooked to the support bracket 50 and the other end thereof is hooked to the pressing claw 60. In this way, the first pivot member 70 and the pressing claw 60 are normally urged to pivot in a retracting direction in which the pressing portion 64 does not press the leading end of the loop handle 33, as seen from the support bracket 50. The first pivot member 70 is held at the position (as an initial position) in which the engaging portion 74 is in contact with an end surface of the second pivot member 80 (to be described later).

The second pivot member 80 is disposed adjacent to the first pivot member 70 in the forward direction. The second pivot member 80 is a band plate-like member and pivots about a second support shaft 88 attached to the side surface portion 54 of the support bracket 50. A second inner hook portion 86 to which an inner member 120a of a second inner cable 120 is hooked is provided to an upper end of the second pivot member 80. A swing bracket pivot support portion 82 for pivotally supporting a swing bracket 90 is provided to a lower end of the second pivot member 80. A stopper 85 for restricting the pivoting of the swing bracket 90 in one direction is provided in the vicinity of the swing bracket pivot support portion 82. The second pivot member 80 is provided with an engaged portion 84 at a position facing the engaging portion 74 of the first pivot member 70 in the front and rear direction.

When the engaged portion 84 of the second pivot member 80 and the engaging portion 74 of the first pivot member 70 are engaged, the pivoting of the first pivot member 70 is restricted. In a pivot position in which the pivoting of the first pivot member 70 is restricted, the pressing portion 64 of the pressing claw 60 pivoting integrally with the first pivot member 70 presses the leading end of the loop handle 33 through the first cutout hole 21h, the second cutout hole 3fh and the third cutout hole 58, and the pivot position is continuously held against the urging force of the first coil spring 77. That is, in the state where the engaging portion 74 of the first pivot member 70 and the engaged portion 84 of the second pivot member 80 are engaged, the locking released state 30B (see FIG. 20) is held.

A second coil spring 87 for urging the second pivot member 80 to pivot relative to the support bracket 50 is hooked between the support bracket 50 and the second pivot member 80. One end of the second coil spring 87 is hooked to the support bracket 50 and the other end thereof is hooked to the second pivot member 80. In this way, the second pivot member 80 is normally urged to pivot relative to the support bracket 50 in a direction in which the engaged portion 84 is engaged with the engaging portion of the first pivot member 70. The second pivot member 80 is held at the position (as an initial position) in which its end surface and the engaging portion 74 of the first pivot member 70 are in contact with each other.

Further, the swing bracket 90 is pivotably supported on the swing bracket pivot support portion 82 via a third support shaft 93. The swing bracket 90 has a band-plate shape and extends in a direction protruding further downward from the swing bracket pivot support portion 82. A third coil spring 97 for urging the swing bracket 90 to pivot relative to the second pivot member 80 is hooked between the swing bracket 90 and the third support shaft 93. In the illustration of FIG. 4, the swing bracket 90 is normally urged to pivot in a clockwise direction by the third coil spring 97. Further, the stopper 85 restricts the pivoting in the clockwise direction of the swing bracket 90 relative to the second pivot member 80 at an intermediate position. In this way, in the illustration of FIG. 4, the swing bracket 90 is in a mode that the pivoting in a counterclockwise direction is allowed and the pivoting in the clockwise direction is restricted at the intermediate position. In other words, the leading end of the swing bracket 90 is allowed to pivot toward the rear side and is restricted to pivot toward the front side at the position where it is in contact with the stopper 85.

A protruding bracket 100 (shifting preparation mechanism part) is provided to the lower rail 10 side at a position on the front side of the lockable region 35. The protruding bracket 100 has a substantially Z shape and has a plate surface protruding horizontally toward the right side of the right surface portion 12R of the lower rail 10. Here, in the protruding bracket 100, the front side of the plate surface is a front contact portion 102 in contact with the swing bracket 90 and the rear side thereof is a rear contact portion 104 in contact with the swing bracket 90. The protruding bracket 100 is configured as a functional part which holds the locking released state 30B of the slide lock mechanism 30 when the swing bracket 90 comes into contact with the rear contact portion 104 and which shifts the locking released state 30B to a state where the slide lock mechanism 30 is capable of shifting to the locked state 30A when the swing bracket 90 comes into contact with the front contact portion 102.

The first cable 110 has a double structure in which a linear inner member 110*a* is inserted into a pipe of a pipe-shaped outer member 110*b*. One end of the inner member 110*a* is hooked on the first inner hook portion 76 of the first pivot member 70. One end of the outer member 110*b* is hooked on a first spring hook bracket 112 fixed to the support bracket 50. The other ends of the inner member 110*a* and the outer member 110*b* are hooked to the seat back 2 side. In this way, as the seat back 2 is tilted forward, the moving distance of the first cable 110 due to the forward tilting of the seat back 2 is converted into the pulling of the inner member 110*a*, thereby pivoting the first pivot member 70.

The second cable 120 has a double structure in which a linear inner member 120*a* is inserted into a pipe of a pipe-shaped outer member 120*b*. One end of the inner member 120*a* is hooked on the second inner hook portion 86 of the second pivot member 80. One end of the outer member 120*b* is hooked on a second spring hook bracket 122 fixed to the support bracket 50. The other ends of the inner member 120*a* and the outer member 120*b* are hooked to the seat main body 1 side. In this way, the inner member 120*a* of the second cable 120 is pulled in response to an operation at the seat main body 1 side, thereby pivoting the second pivot member 80.

Next, a series of operation contents of the automobile seat in the present embodiment will be described with reference to FIGS. 5 to 20. Here, in the illustration of FIGS. 12 to 18, since the first pivot member 70, the second pivot member 80, and the pressing claw 60 overlap with each other, the pressing claw 60 is extracted and shown in order to make it easy to grasp the movement of each member.

Figure 5:
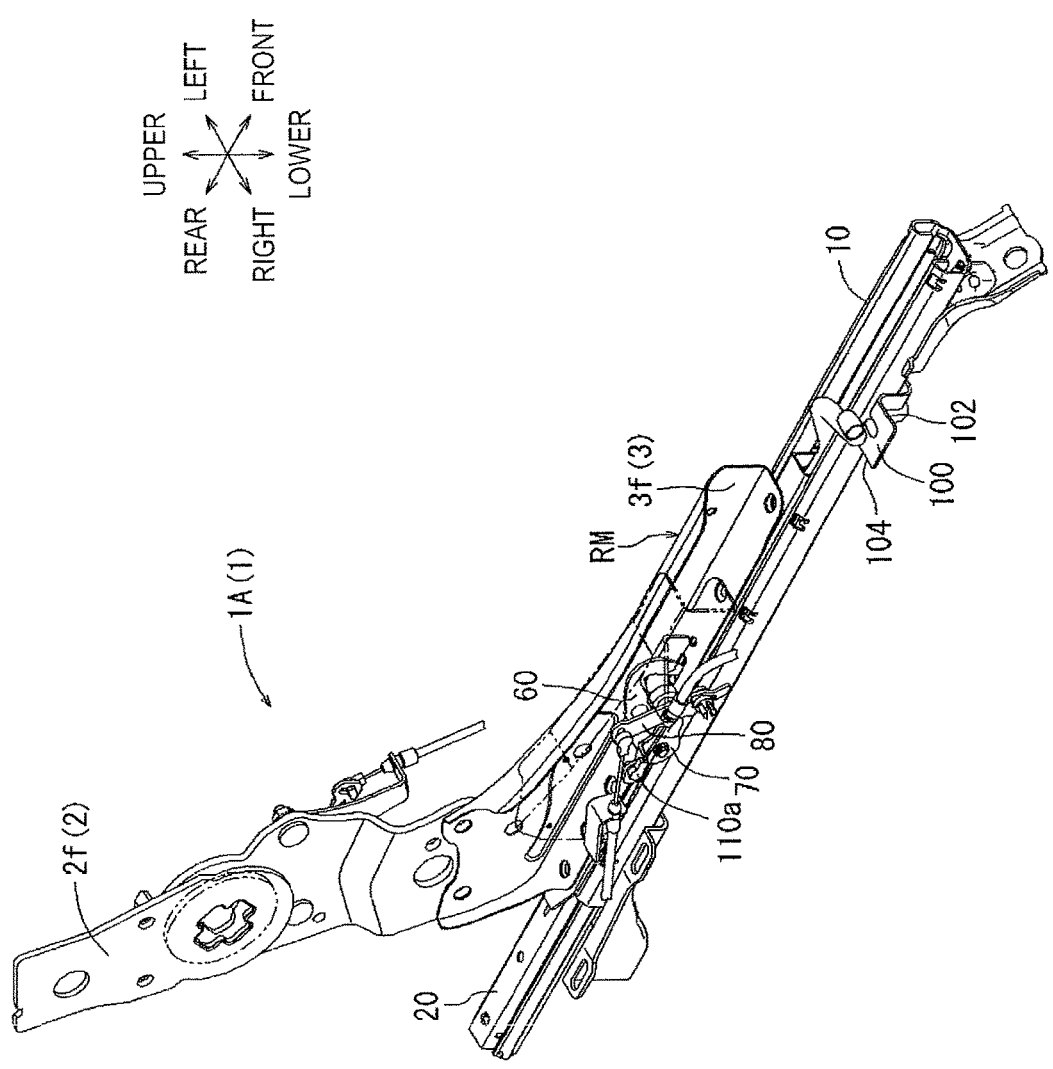
FIG. 5 is a perspective view showing a state where a seat main body of the automobile seat is positioned at the rearmost position in a lockable region of a slide lock mechanism.
Figure 12:
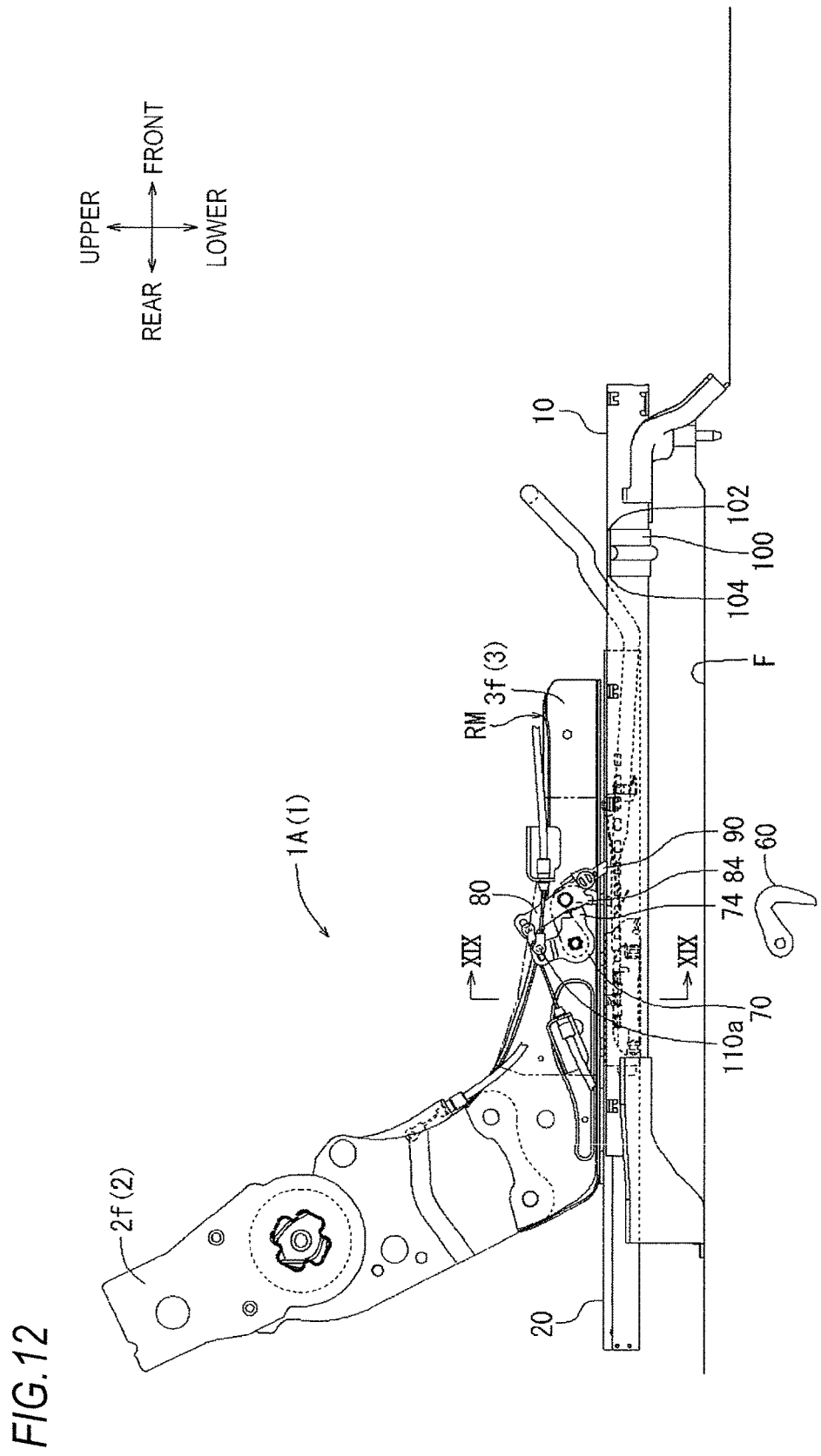
FIG. 12 is a schematic operation diagram schematically showing the operation in FIG. 5 from the side.

<Normal State of Seat Main Body 1: FIGS. 5, 12 and 19>

As shown in FIGS. 5 and 12, when the seat main body 1 is in the upright state 1A in which the seat back 2 stands with respect to the seat cushion 3, the inner member 110*a* is not pulled by the first cable 110, and thus, the first pivot member 70 is held at the initial position where it is not pivoted. Therefore, the pressing portion 64 of the pressing claw 60 is urged to pivot in a direction of being retracted without pressing the leading end of the loop handle 33. In this way, the slide lock mechanism 30 is in the locked state 30A where the claw shapes of the lock claw 31 are inserted through the through-holes 25 and the lock holes 15 in the positional state where the through-holes 25 and the lock holes 15 are aligned. Here, the slide lock mechanism 30 is shown as being in the locked state 30A at the position of the rearmost position RM.

Figure 6:
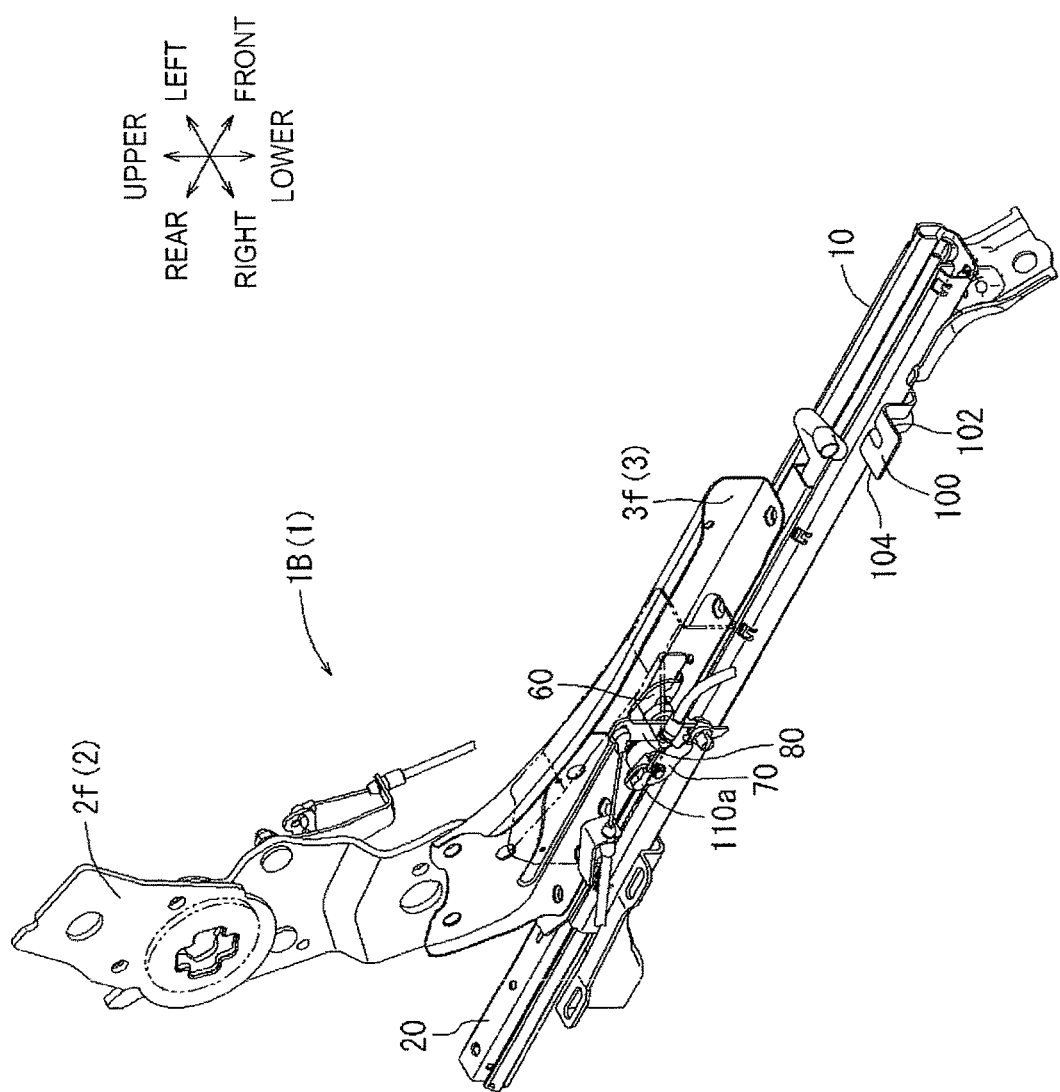
FIG. 6 is a perspective view showing a state where a seat back of the automobile seat is being tilted forward.
Figure 7:
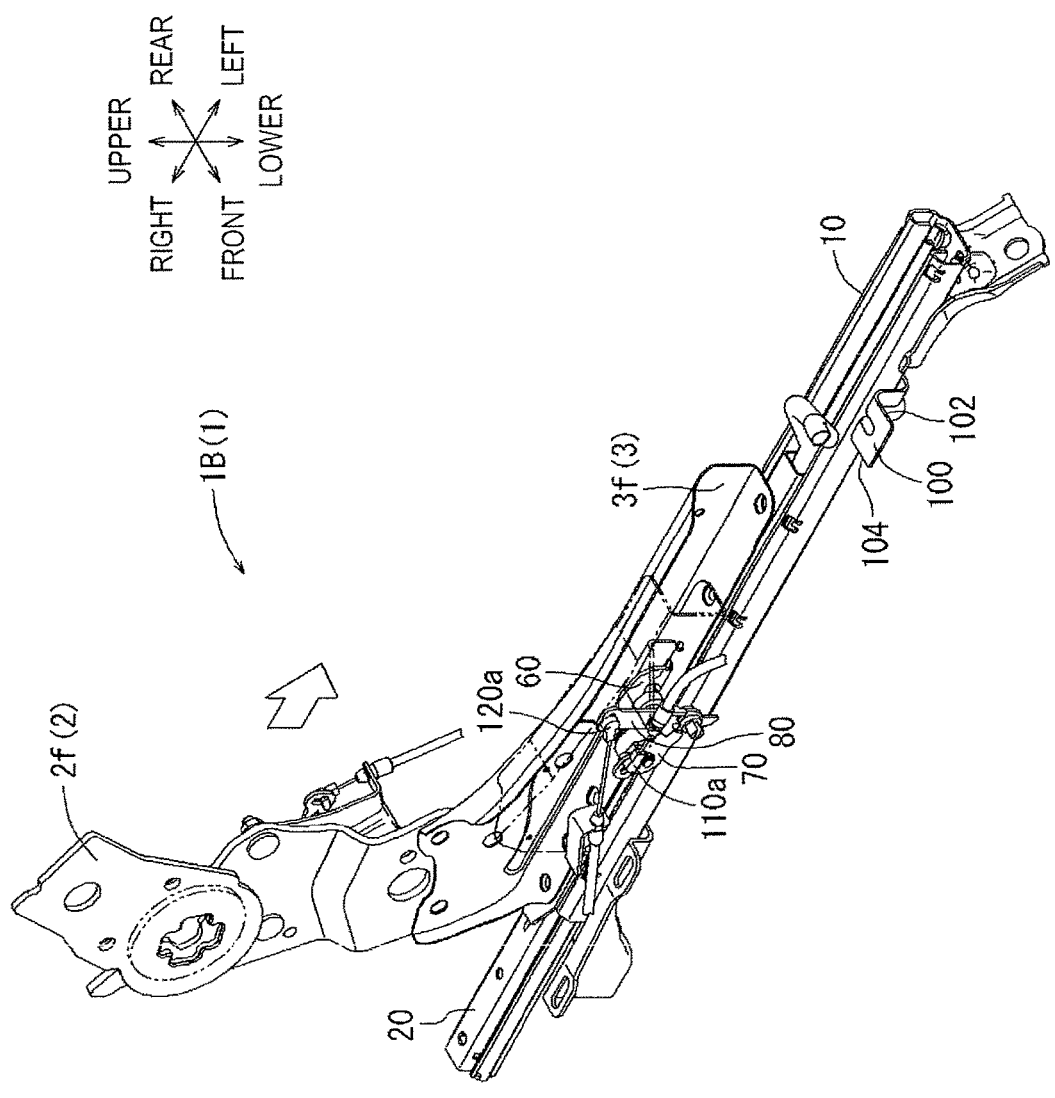
FIG. 7 is a perspective view showing a state where the forward tilting of the seat back of the automobile seat is completed.
Figure 8:
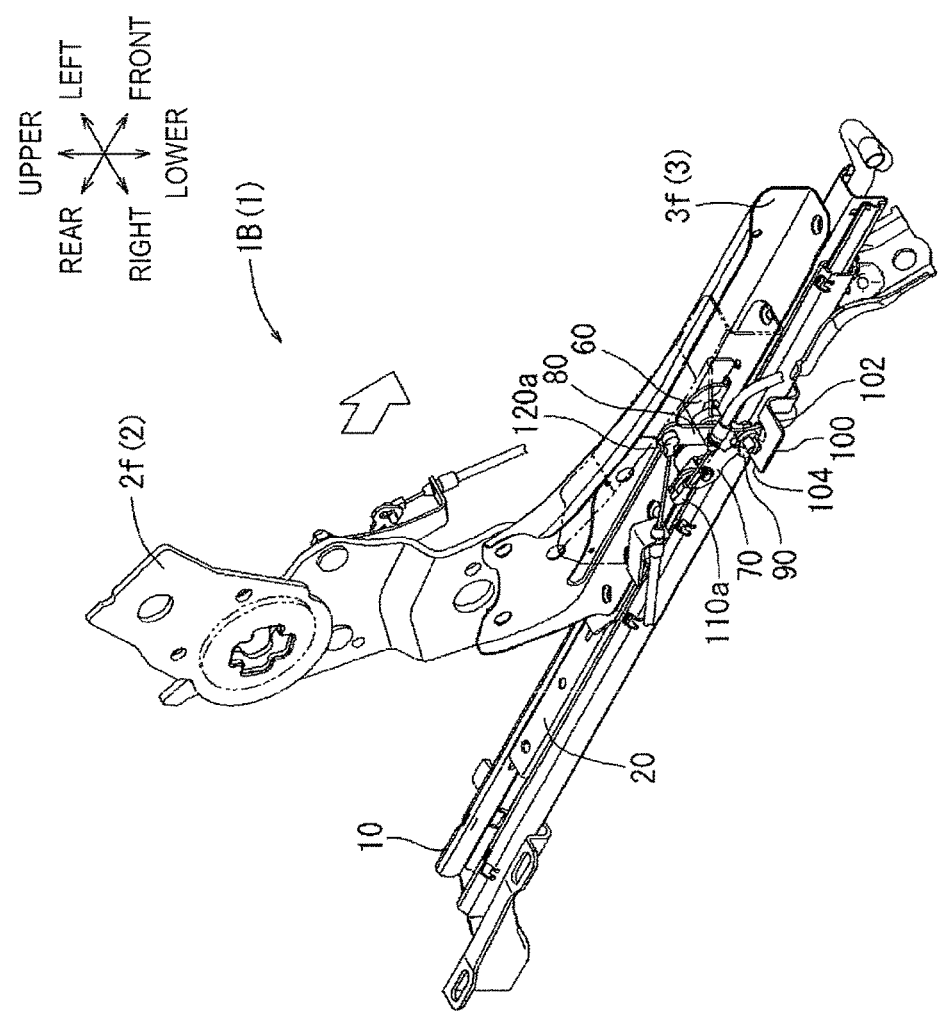
FIG. 8 is a perspective view showing a walk-in state of the seat main body of the automobile seat.
Figure 13:
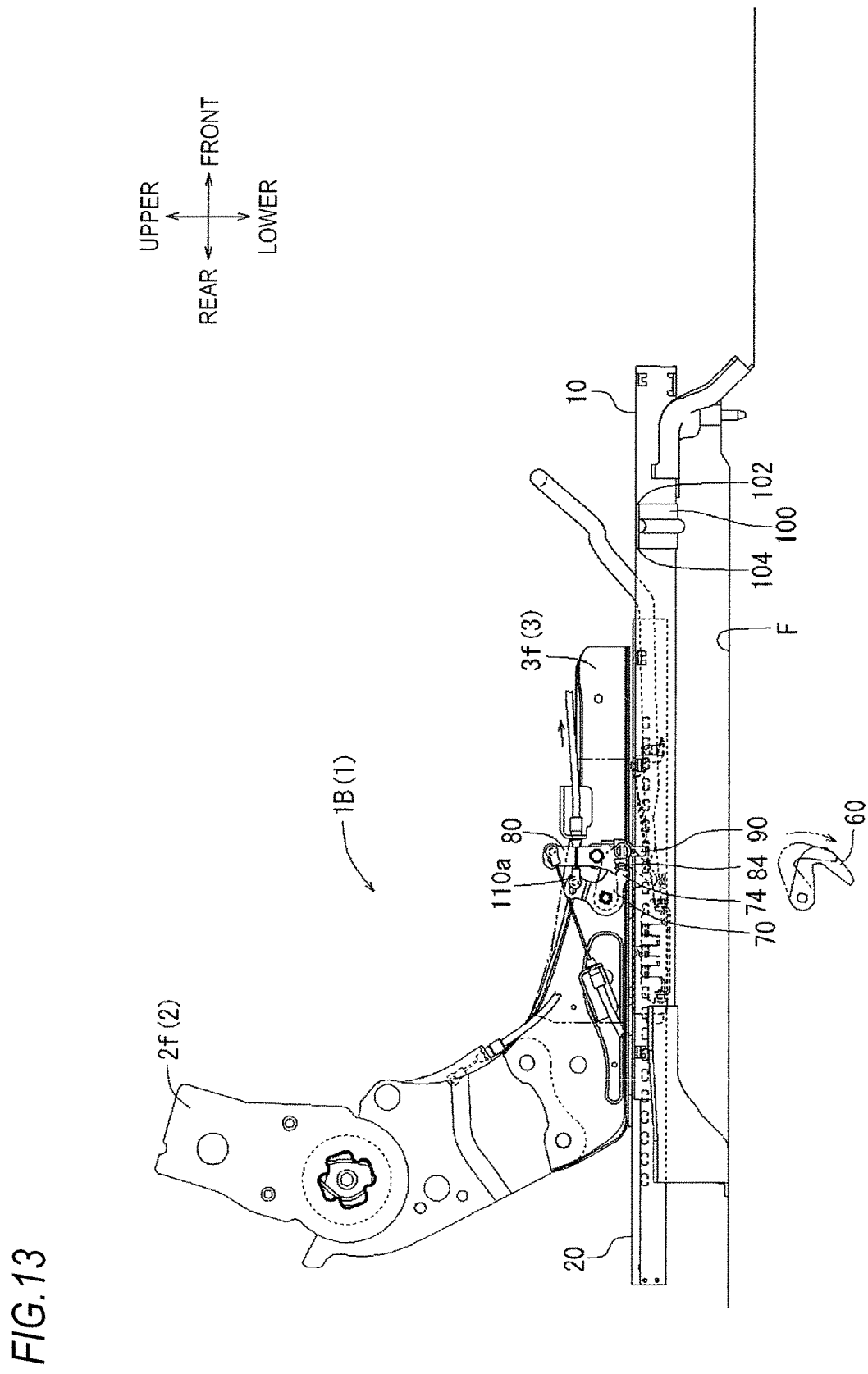
FIG. 13 is a schematic operation diagram schematically showing the operation in FIG. 6 from the side.
Figure 14:
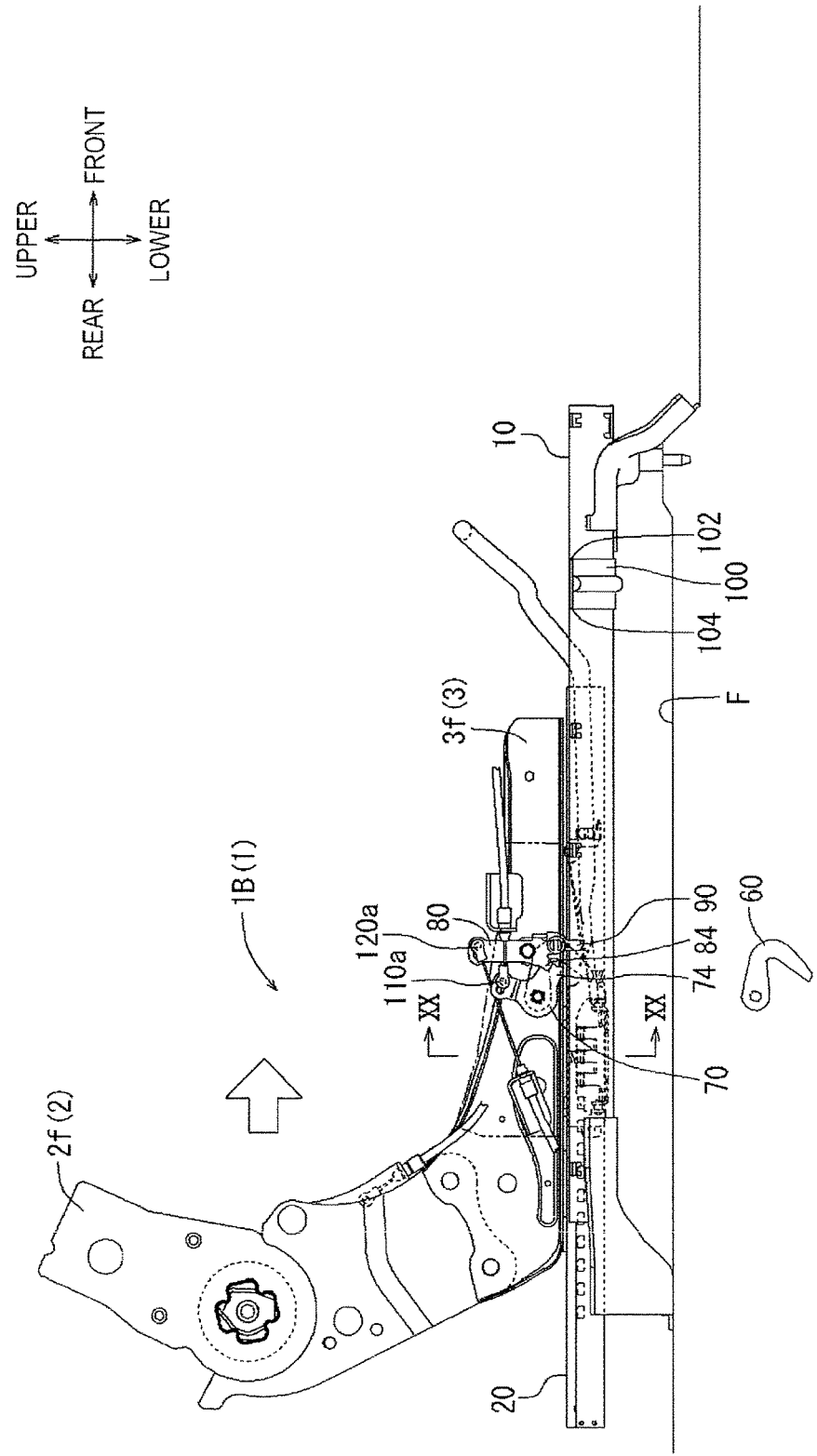
FIG. 14 is a schematic operation diagram schematically showing the operation in FIG. 7 from the side.

<During Forward Tilting of Seat Back 2: FIGS. 6, 13 and 20>

When the seat back 2 starts to be tilted forward by a pivoting operation of the operating lever, the moving distance due to the pivoting of the seat back 2 is converted into the pulling of the inner member 110*a*, and thus, the first pivot member 70 is pivoted in the clockwise direction in FIGS. 6 and 13. Further, as shown in FIG. 20, the pressing portion 64 of the pressing claw 60 pivoting integrally with the first pivot member 70 presses the leading end of the loop handle 33 through the first cutout hole 21*h*, the second cutout hole 3*fh*, and the third cutout hole 58 (see FIGS. 2 to 4). The leading end portion of the loop handle 33 is positioned at a pressing position in which it presses the upper surface of the cut-and-raised piece 31*b* of the lock claw 31 against the urging force of the plate spring 32. In this way, the slide lock mechanism 30 is in the locking released state 30B. Further, the second pivot member 80 pivots in the clockwise direction in the figure by the urging of the second coil spring 87 (see FIG. 4). In this way, the engaging portion 74 of the first pivot member 70 and the engaged portion 84 of the second pivot member 80 are engaged. Therefore, the locking released state 30B of the slide lock mechanism 30 is held.

<Completion of Forward Tilting of Seat Back 2: FIGS. 7, 14, 19 and 20>

When the forward tilting of the seat back 2 is completed, the pulling of the inner member 110*a* of the first cable 110 is released. Therefore, the first pivot member 70 is urged in the counterclockwise direction in the figure by the first coil spring 77 (see FIG. 4). However, since the engaging portion 74 of the first pivot member 70 and the engaged portion 84 of the second pivot member 80 are engaged, the locking released state 30B (see FIG. 20) of the slide lock mechanism 30 is held. In this way, the seat main body 1 in the forward-tilted state 1B can be slid forward. Meanwhile, when the inner member 120a of the second cable 120 is pulled in response to an operation at the seat main body 1 side, the engagement between the engaging portion 74 of the first pivot member 70 and the engaged portion 84 of the second pivot member 80 are released. Accordingly, the first pivot member 70 is urged by the first coil spring 77, thereby being urged in the counterclockwise direction in the figure. Accordingly, as shown in FIG. 19, the pressing portion 64 of the pressing claw 60 is pivotally urged in a direction of being retracted without pressing the leading end of the loop handle 33. The leading end portion of the loop handle 33 is moved to an initial position where it does not press the cut-and-raised piece 31b of the lock claw 31 by the urging of the plate spring 32. Since the lock claw 31 is positioned in the lockable region 35 (see FIGS. 2 and 3), the lock claw is locked with the lock holes 15, and thus, the slide lock mechanism 30 is in the locked state 30A. The configuration in which the inner member 120a of the second cable 120 is pulled by such operation at the seat main body 1 side corresponds to the "cancel mechanism" of the disclosure.

<During Walk-in of Seat Main Body 1: FIGS. 8, 15, 19 and 20>

When the seat main body 1 is slid forward, the swing bracket 90 comes into contact with the rear contact portion 104. At this time, the swing bracket 90 is allowed to pivot in the clockwise direction in the figure. Therefore, the swing bracket 90 pivots in the clockwise direction when it comes into contact with the rear contact portion 104. Thus, the locking released state 30B of the slide lock mechanism 30 is held in the state where the engaging portion 74 of the first pivot member 70 and the engaged portion 84 of the second pivot member 80 are engaged with each other. In this walk-in mechanism 40, the configuration in which the swing bracket 90 pivots in the clockwise direction when it comes into contact with the rear contact portion 104 of the protruding bracket 100 and thus the locking released state 30B of the slide lock mechanism 30 is held corresponds to the "holding mechanism part" of the disclosure.

Figure 9:
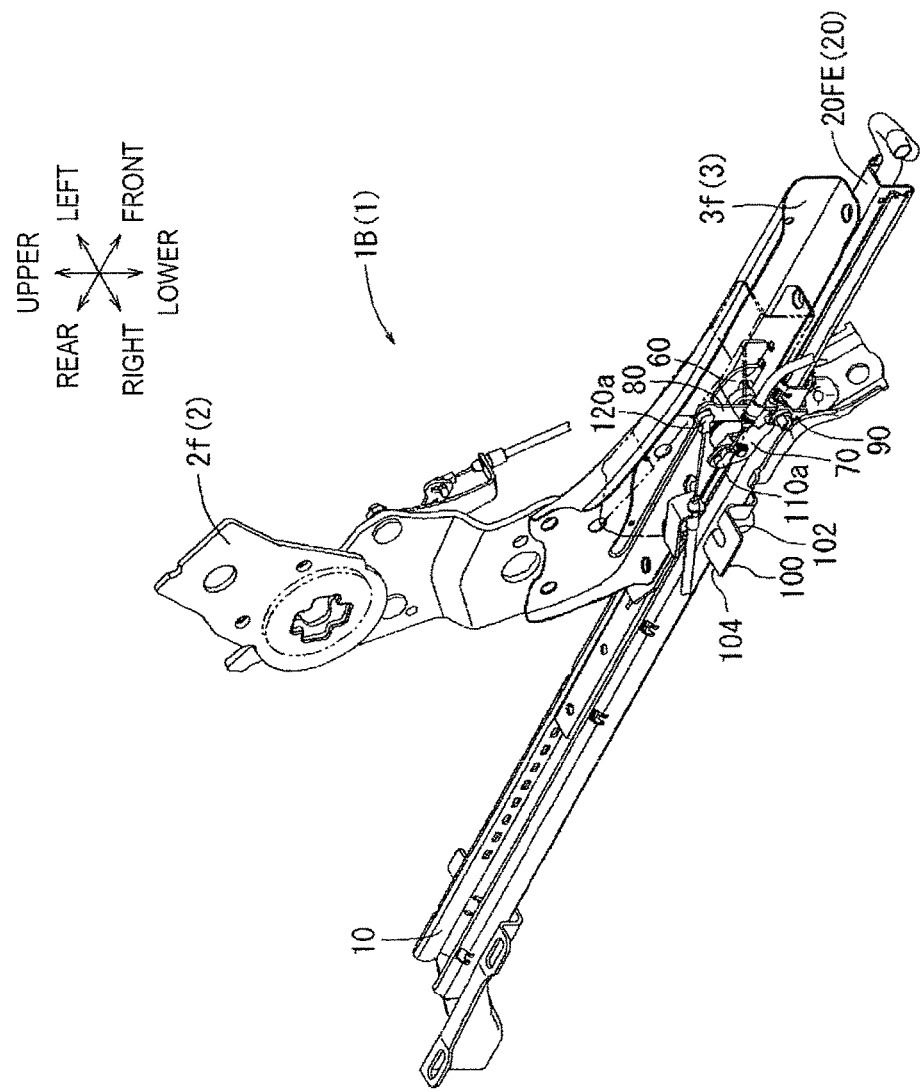
FIG. 9 is a perspective view showing a state where the walk-in of the seat main body of the automobile seat is completed.
Figure 10:
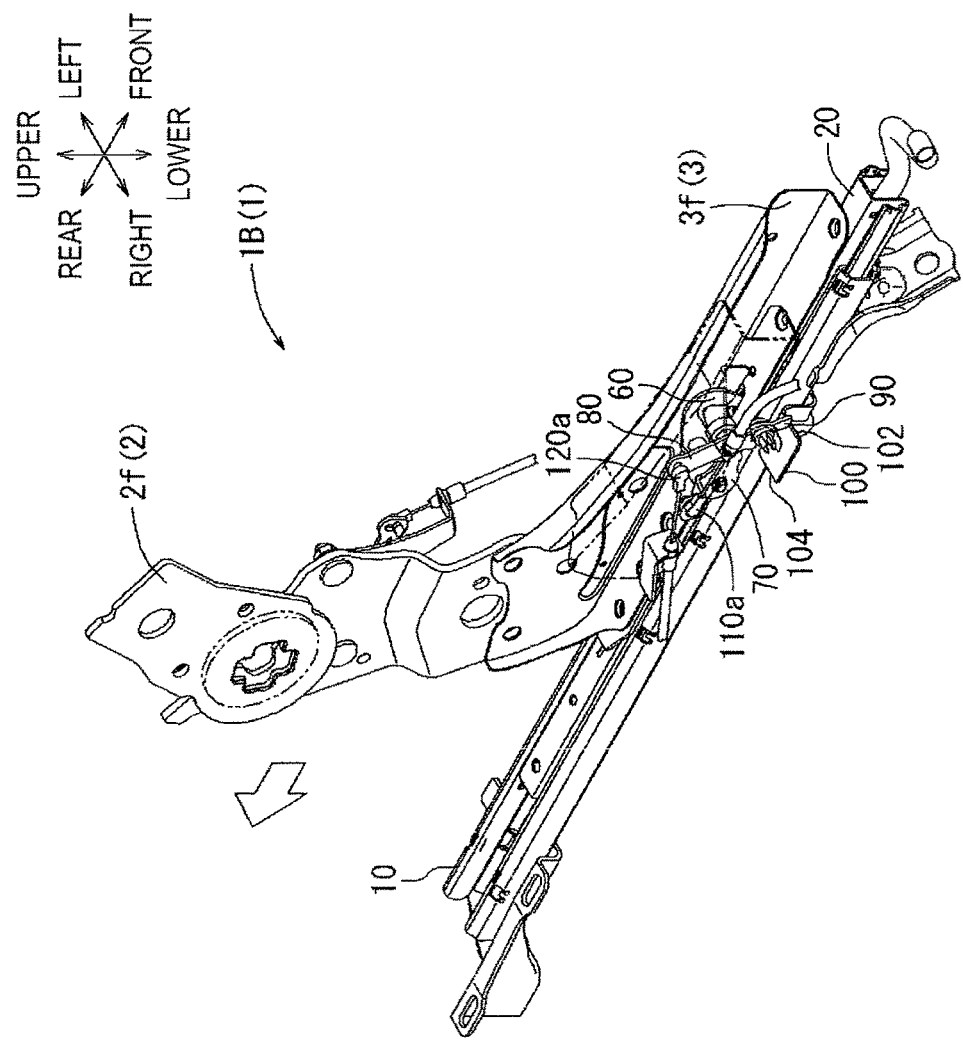
FIG. 10 is a perspective view showing a state where the seat main body of the automobile seat slidably moves rearward from the foremost sliding position.
Figure 16:
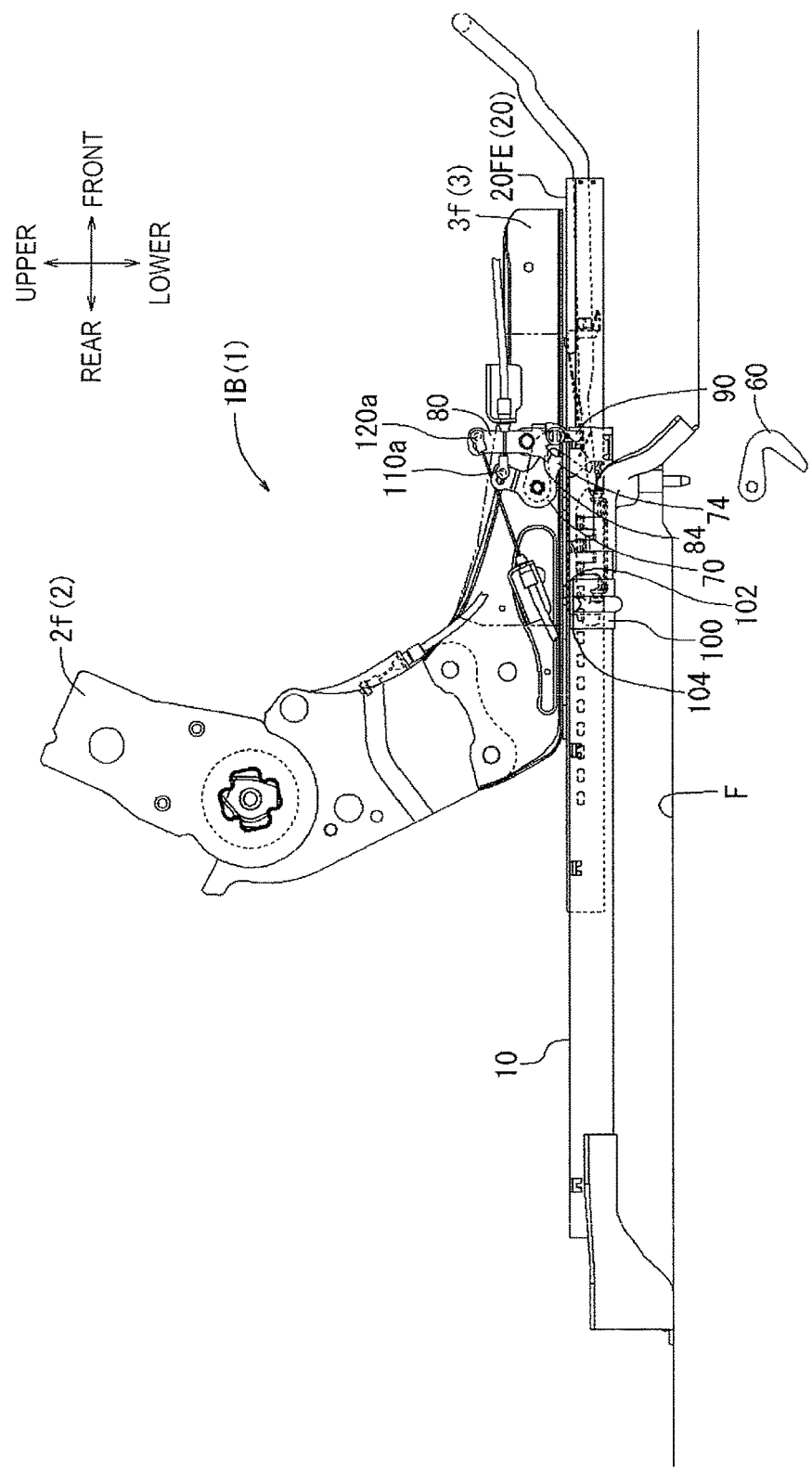
FIG. 16 is a schematic operation diagram schematically showing the operation in FIG. 9 from the side.
Figure 17:
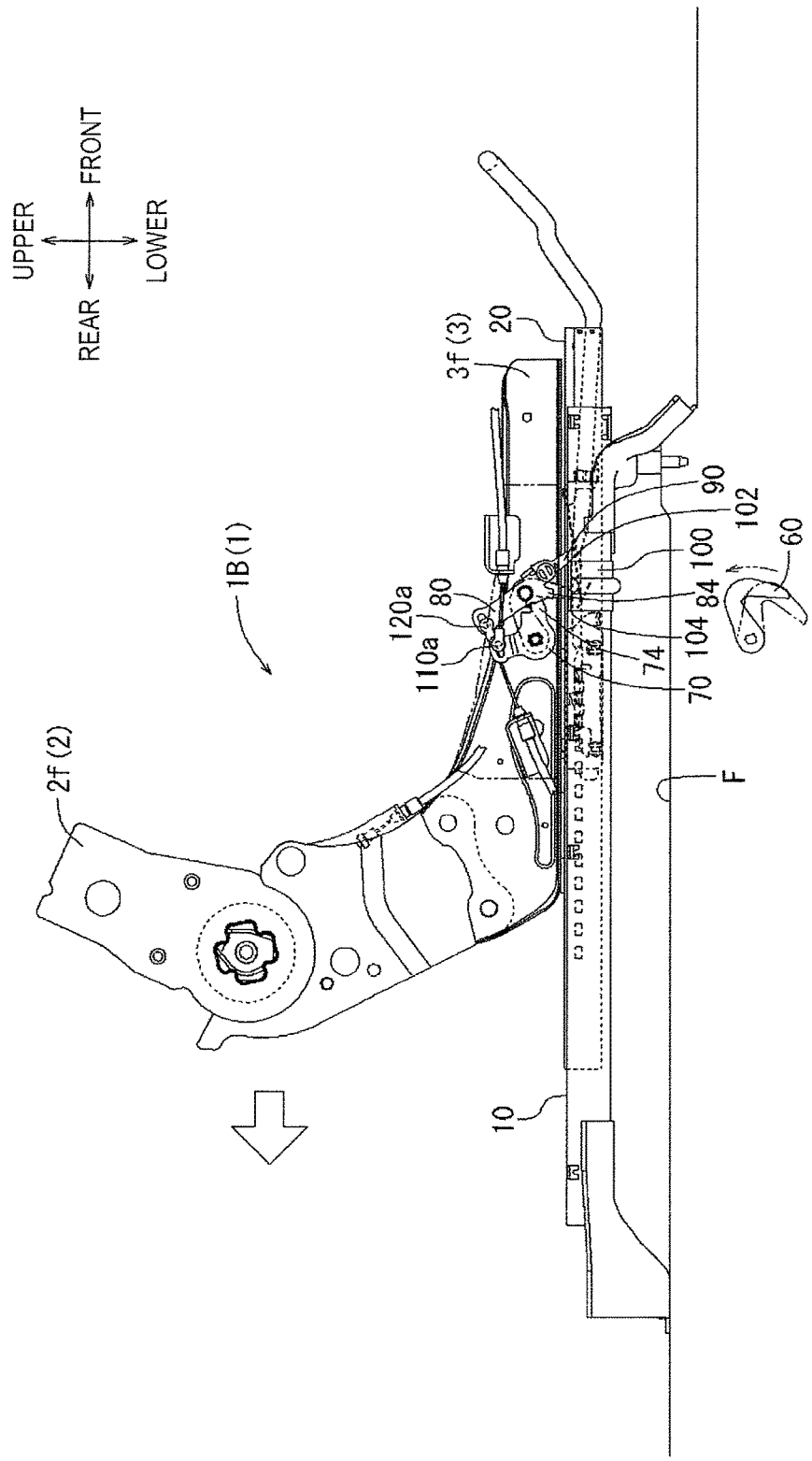
FIG. 17 is a schematic operation diagram schematically showing the operation in FIG. 10 from the side.
Figure 18:
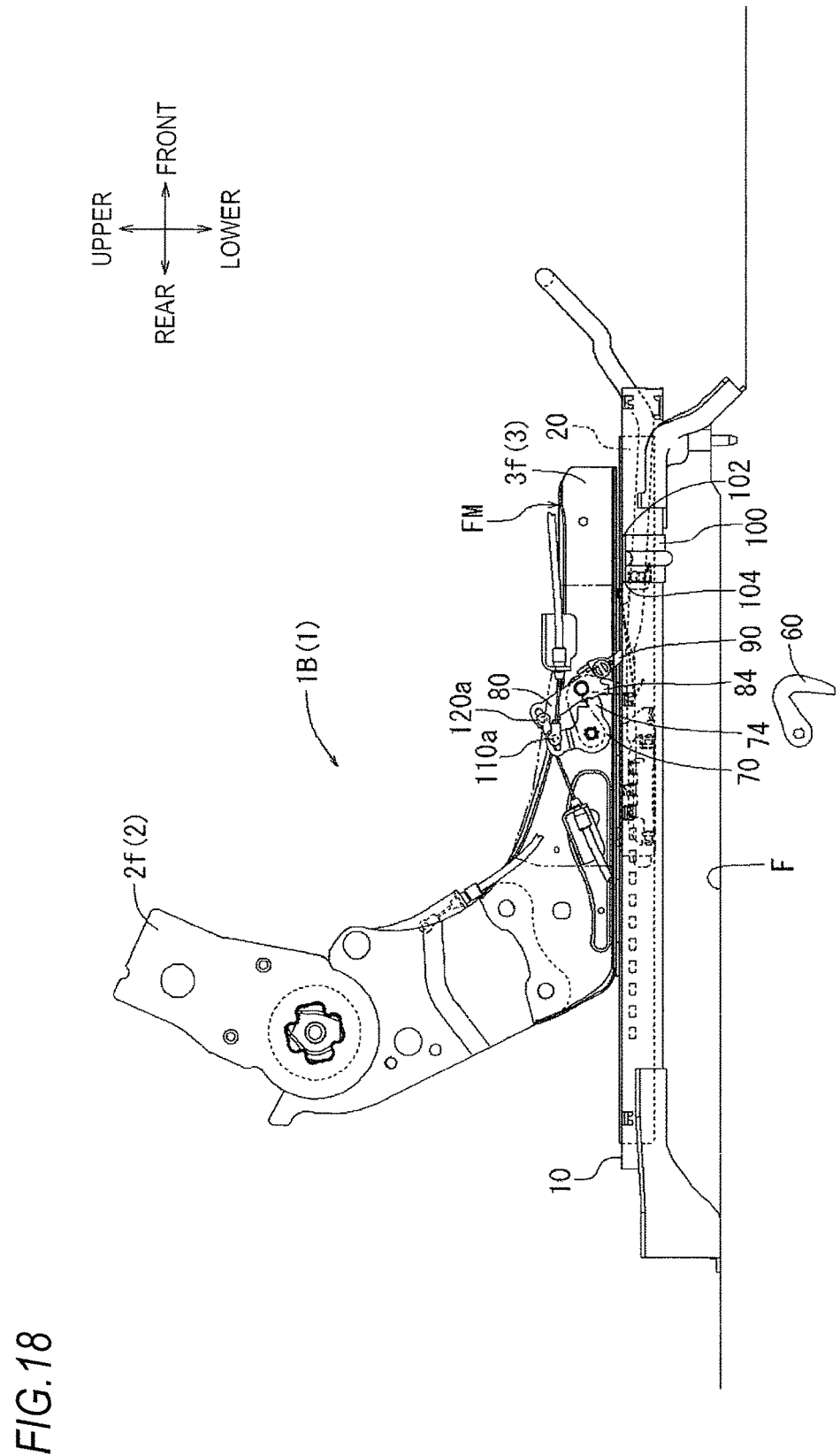
FIG. 18 is a schematic operation diagram schematically showing the operation in FIG. 11 from the side.

<Completion of Walk-in of Seat Main Body 1: FIGS. 9, 16 and 20>

The seat main body 1 slides to the foremost sliding position 20FE to which the sea main body 1 can slide. As a result, the space behind the seat main body 1 becomes wider, and thus, a walk-in state where an occupant of a third seat behind the seat main body can easily get on and off is obtained. Meanwhile, the slide lock mechanism 30 in the foremost sliding position 20FE is continuously held in the locking released state 30B.

<Rearward Sliding Movement of Seat Main Body 1: FIGS. 10, 17, 19 and 20>

When the seat main body 1 is slid rearward from the foremost sliding position 20FE, the swing bracket 90 comes into contact with the front contact portion 102 of the protruding bracket 100. The pivoting of the swing bracket 90 in the counterclockwise direction in the figure is restricted by the stopper 85 (see FIG. 4). Therefore, the swing bracket 90 and the second pivot member 80 integrally pivot in the counterclockwise direction in the figure. As a result, the engaging portion 74 of the first pivot member 70 is detached from the engaged portion 84 of the second pivot member 80. Therefore, the first pivot member 70 is urged by the first coil spring 77 (see FIG. 4) and is urged in the counterclockwise direction in the figure. As a result, the pressing portion 64 of the pressing claw 60 is urged to pivot in a direction of being retracted without pressing the leading end of the loop handle 33. The leading end portion of the loop handle 33 is moved to an initial position where it does not press the cut-and-raised piece 31b of the lock claw 31 by the urging of the plate spring 32 (see FIG. 19). In this way, the claw shapes of the lock claw 31 in the slide lock mechanism 30 are urged in the direction of being inserted through the through-holes 25 and the lock holes 15. However, since the lock claw 31 is positioned on the front side of the lockable region 35 (see FIGS. 2 and 3) in the lower rail 10, the claw shapes of the lock claw 31 are in a locking preparation state where the claw shapes are in contact with the left folded-back surface portion 13L of the lower rail 10. That is, the configuration in which the locking released state 30B of the slide lock mechanism 30 is shifted a state where the slide lock mechanism 30 is capable of shifting to the locked state 30B corresponds to the "holding release mechanism part" of the disclosure.

Figure 11:
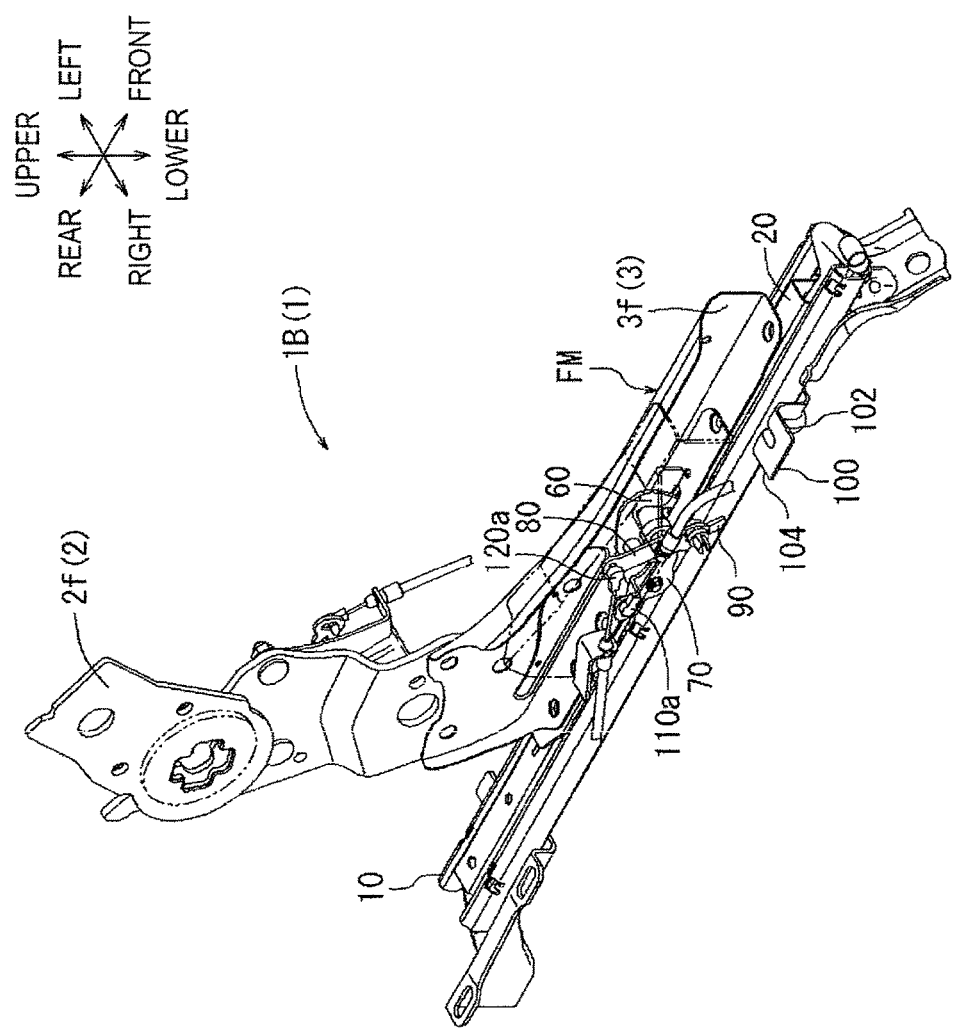
FIG. 11 is a perspective view showing a state where the seat main body of the automobile seat is positioned at the foremost position in the lockable region of the slide lock mechanism.
Figure 15:
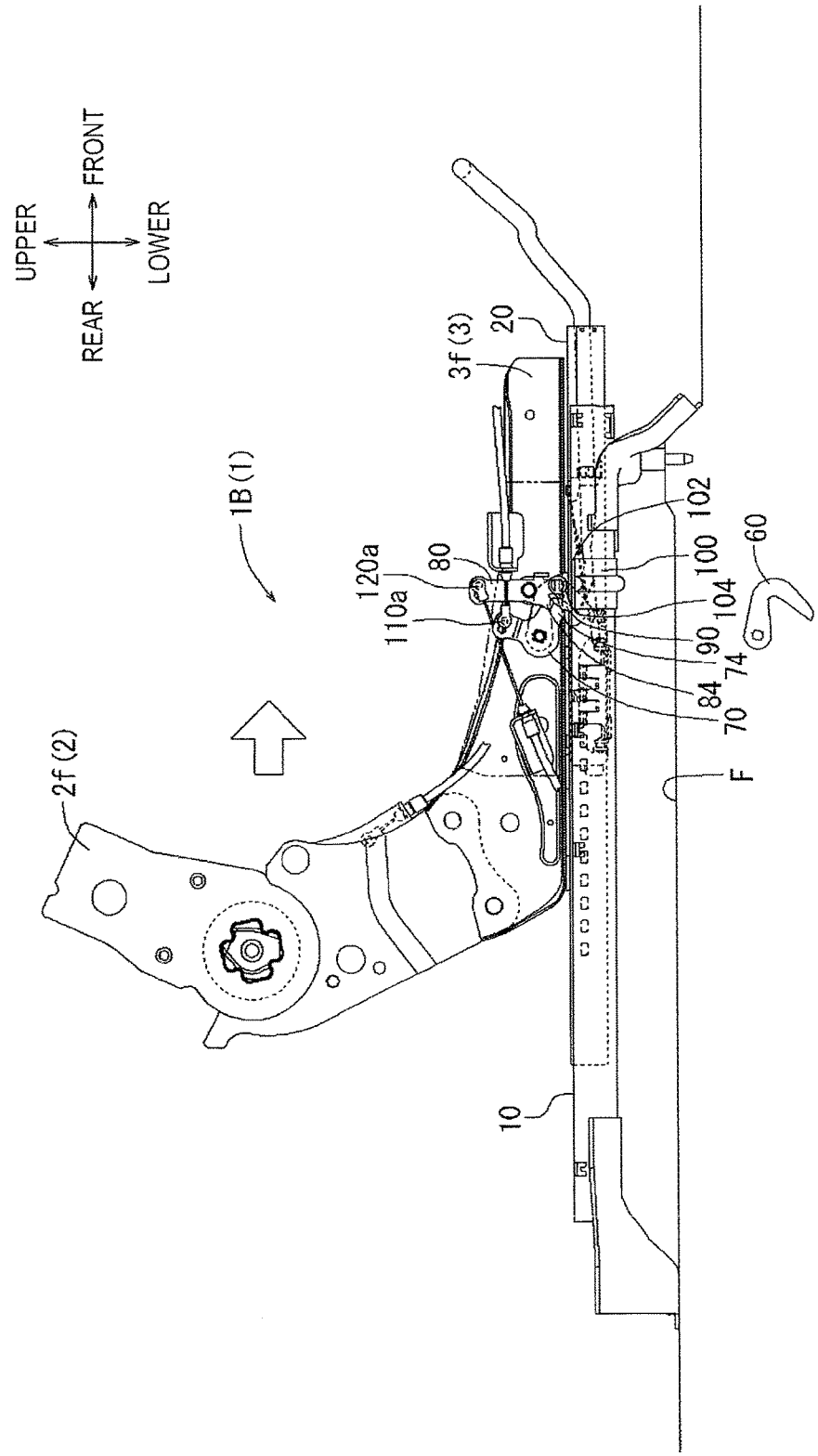
FIG. 15 is a schematic operation diagram schematically showing the operation in FIG. 8 from the side.

<Slide Lock of Seat Main Body 1 at Frontmost position FM: FIGS. 11, 15 and 19>

When the seat main body 1 is slid rearward and reaches the frontmost position FM, the lock claw 31 is locked to the lock holes 15 at the frontmost position FM. In this way, the slide lock mechanism 30 is in the locked state 30A.

As described above, according to the automobile seat of the above described embodiment, when the seat main body 1 in which the seat back 2 is in the forward-tilted state 1B is moved to the foremost sliding position 20FE to which the seat main body 1 can slide, the swing bracket 90 pivots in the counterclockwise direction when it comes into contact with the rear contact portion 104 of the protruding bracket 100. Therefore, the locking released state 30B of the slide lock mechanism 30 is held. On the other hand, when the seat main body 1 in which the seat back 2 is in the forward-tilted state 1B is moved rearward from the foremost sliding position 20FE to which the seat main body 1 can slide, the locking released state 30B of the slide lock mechanism 30 can be shifted to the state where the slide lock mechanism 30 is capable of shifting to the locked state 30A by the configuration in which the swing bracket 90 comes into contact with the front contact portion 102 of the protruding bracket 100. Therefore, the lock claw 31 (locked part) and the lock holes 15 (locking part) are locked at the foremost position of the lockable region 35 of the slide lock mechanism 30. Accordingly, even when the seat main body 1 remains in the forward-tilted state 1B, the slide lock is carried out by using the frontmost position FM that is the foremost position of the lockable region 35 serving as the fixed position. As a result, it is possible to realize a vehicle seat including the walk-in mechanism 40 in which the slide lock at the frontmost position FM after the walk-in operation is possible even when the seat back 2 is in the forward-tilted state 1B. Further, since the seat main body 1 is slide-locked by using the frontmost position FM of the lockable region 35 serving as the fixed position when the seat main body 1 remains in the forward-tilted state 1B, it is possible to secure a wider space behind the seat main body. In this way, it is possible to further enhance the convenience in the sliding operation of the seat main body 1 including the walk-in mechanism 40.

Further, the walk-in mechanism 40 includes the cancel mechanism which is separate from the swing bracket 90 and shifts the locking released state 30B of the slide lock mechanism 30 to the state where the slide lock mechanism 30 is capable of shifting to the locked state 30A in response to the operation at the seat main body 1 side. In this way, the seat main body 1 can be slide-locked in a separate manner as using the swing bracket 90. As a result, it is possible to further improve the convenience in the sliding operation of the seat main body 1 including the walk-in mechanism 40.

Although the embodiments of the disclosure have been described above, the automobile seat of the disclosure is not limited to these embodiments, but can be implemented in various other forms. For example, in the present embodiment, one lockable region 35 is provided. However, a plurality of lockable regions may be provided along the longitudinal direction of the lower rail 10. In the present embodiment, the swing bracket 90 has two functions of the holding mechanism part and the holding release mechanism part. However, the holding mechanism part and, the holding release mechanism part may be separately provided. In the present embodiment, the slide rails 6 are supported on the floor surface F. However, the interior wall surface in the disclosure also includes a wall surface constituting an interior of a vehicle, in addition to the floor surface F. Further, in the present embodiment, the lock holes 15 (locking part) are provided in the lower rail 10 (first rail) and the lock claw 31 (locked part) is provided in the upper rail 20 (second rail). However, the disclosure is not limited thereto, and the configuration may be reversed.

What is claimed is:

1. A vehicle seat comprising:
   an elongated first rail fixable to an interior wall surface of a vehicle;
   a second rail which is configured to move relative to the first rail in a longitudinal direction thereof and support a seat main body;
   a slide lock which is configured to lock a locked part provided to a second rail side to a locking part provided to a first rail side or release the locking of the locked part and the locking part at a predetermined relative position of the second rail to the first rail in a lockable region, the lockable region being a region where the locking part and the locked part are configured to be selectively locked to each other at a plurality of positions in the longitudinal direction; and
   a walk-in mechanism which is provided to the first rail side and the second rail side and is configured to release a locked state of the slide lock and hold a state where the locked state is released in association with a forward tilting operation of a seat back,
   wherein the walk-in mechanism includes a shifting preparation mechanism part which is provided to the first rail side at a position on a front side of the lockable region and is configured to shift the slide lock from a locking released state to a state where the slide lock is shifted to the locked state, and
   wherein the walk-in mechanism includes a holder which is provided to the second rail side and holds the locking released state of the slide lock when the seat main body in which the seat back is in a forward-tilted state is slid so as to come into contact with the shifting preparation mechanism part from the rear side, and a holding release which is provided to the second rail side and shifts the locking released state of the slide lock to the state where the slide lock is shifted to the locked state when the seat main body in which the seat back is in the forward-tilted state is moved rearward from a foremost position to which the seat main body can slide and comes into contact with the shifting preparation mechanism part from the front side.

2. The vehicle seat according to claim 1, further comprising a cancel mechanism which is separate from the holding release and shifts the locking released state of the slide lock to the state where the slide lock shifts to the locked state in response to an operation at the seat main body side.

3. The vehicle seat according to claim 1, further comprising a first pivot member positioned adjacent to a second pivot member.

4. A vehicle seat comprising:
   an elongated first rail fixable to an interior wall surface of a vehicle;
   a second rail which is configured to move relative to the first rail in a longitudinal direction thereof and support a seat main body;
   a slide lock which is configured to lock a locked part provided to a second rail side to a locking part provided to a first rail side or release the locking of the locked part and the locking part at a predetermined relative position of the second rail to the first rail in a lockable region, the lockable region being a region where the locking part and the locked part are configured to be selectively locked to each other at a plurality of positions in the longitudinal direction; and
   a walk-in mechanism which is provided to the first rail side and the second rail side and is configured to release a locked state of the slide lock and hold a state where the locked state is released in association with a forward tilting operation of a seat back,
   wherein the walk-in mechanism includes a shifting preparation mechanism part which is provided to the first rail side at a position on a front side of the lockable region and is configured to shift the slide lock from a locking released state to a state where the slide lock is shifted to the locked state, and
   wherein the walk-in mechanism includes a swing bracket which is provided to the second rail side and holds the locking released state of the slide lock when the seat main body in which the seat back is in a forward-tilted state is slid so as to come into contact with the shifting preparation mechanism part from the rear side, the swing bracket shifts the locking released state of the slide lock to the state where the slide lock is shifted to the locked state when the seat main body in which the seat back is in the forward-tilted state is moved rearward from a foremost position to which the seat main body can slide and comes into contact with the shifting preparation mechanism part from the front side.

5. The vehicle seat according to claim 4, wherein the swing bracket is urged to pivot in a clockwise direction by coil spring.

6. The vehicle seat according to claim 4, wherein a stopper restricts pivoting in the clockwise direction of the swing bracket.

* * * * *